United States Patent [19]

Sekine et al.

[11] Patent Number: 5,793,373
[45] Date of Patent: Aug. 11, 1998

[54] METHOD OF GENERATING SHAPE DATA

[75] Inventors: Hiroshi Sekine; Shuichi Kitazawa; Masanori Tokoi; Masanori Tanuma; Yasuyuki Ohsuga; Ayumi Nakajima; Koji Hara; Yukio Matsumoto, all of Sayama, Japan

[73] Assignee: Honda Giken Kogyo Kabushiki Kaisha, Tokyo, Japan

[21] Appl. No.: 564,641

[22] Filed: Nov. 29, 1995

[30] Foreign Application Priority Data

Nov. 29, 1994 [JP] Japan .................. 6-294902
Nov. 29, 1994 [JP] Japan .................. 6-294930
Nov. 29, 1994 [JP] Japan .................. 6-294939
Nov. 29, 1994 [JP] Japan .................. 6-294952
Nov. 29, 1994 [JP] Japan .................. 6-294961

[51] Int. Cl.$^6$ ............................................. G06T 5/00
[52] U.S. Cl. ................................................. 345/420
[58] Field of Search ............................. 395/120, 121, 395/122, 125, 130, 131

[56] References Cited

U.S. PATENT DOCUMENTS 5,410,645  4/1995  Ooka et al. ................ 395/120 X
5,455,896 10/1995  Takamura ................... 395/120 X
5,475,799 12/1995  Yoshioka et al. ............ 395/120
5,506,947  4/1996  Taubin ....................... 395/120 X
5,561,749 10/1996  Schroeper .................. 395/120

FOREIGN PATENT DOCUMENTS 547 244-A1  6/1993  European Pat. Off. .
58-160041   9/1983  Japan .
WO 93/01535 1/1993  WIPO .

OTHER PUBLICATIONS

Dialog record 01863967 of Hewlett–Packard Journal, v46, n5, Oct., 95, p24 (11), Freitag, Stefan and Opitz, Karsten, "Enhancements in blending algorithms."

Univac Technology Review, No. 16, Feb., 88, pp. 15–29, "Development of a Capability for Generating a Smooth Corner Surface with Arbitrary Number of Boundaries."

"Development of Capability for Generating a Smooth Corner Surface with Arbitrary Number of Boundaries"; from *Journal of Univac Technology Review*, No. 16, pp. 14–28.

*Primary Examiner*—Phu K. Nguyen
*Assistant Examiner*—Cliff N. Vo

[57] ABSTRACT

After fillet surfaces have been generated with respect to surfaces, a joint surface is generated between the fillet surface. New fillet surfaces are determined from the fillet surfaces and the joint surface. Then, a phase relationship is established between data relative to the surfaces and data relative to the new fillet surfaces, and these data are combined into shape data including data of fillet surfaces which are capable of representing the complete shape of a product.

15 Claims, 28 Drawing Sheets

FIG. 38 PRIOR ART

| SURFACE | LOOP CONFIGURATION | | | |
|---|---|---|---|---|
| A 1 | D 1 | D 2 | D 3 | D 4 |
| A 2 | D 3 | D 5 | D 6 | D 7 |
| B | D 8 | D 1 0 | D 9 | D 1 1 |

FIG. 39 PRIOR ART

| SURFACE | LOOP CONFIGURATION | | | |
|---|---|---|---|---|
| A 1* | D 1 | D 2 1 | D 8 | D 4 1 |
| A 2* | D 9 | D 5 2 | D 6 | D 7 2 |
| B | D 8 | D 1 0 | D 9 | D 1 1 |

METHOD OF GENERATING SHAPE DATA

BACKGROUND OF THE INVENTION

1. Field of the Invention

The present invention relates to a method of generating shape data of a product based on a surface model having fillet surfaces between curved surfaces, using a CAD (computer-aided design) system.

2. Description of the Related Art

It has been customary to manufacture a product of complex shape by generating shape data with a CAD system, generating NC (numerical control) machining data for machining a die from the shape data, producing the die based on the NC machining data, and manufacturing the product with the die.

To generate such shape data, wire frame data for the product is first generated. Then, a surface model is generated by establishing curved surfaces relative to the wire frame model. Thereafter, fillet surfaces are established in order to connect the curved surfaces smoothly. One process of generating such fillet surfaces is disclosed in Japanese laid-open patent publication No. 58-160041.

According to the disclosed process, two curved surfaces that are connected to each other are offset in respective directions toward a region where a fillet surface will be generated, and arcs are generated as constituent lines of the fillet surface about a line of intersection between the curved surfaces after they are offset in contact with the curved surfaces before they are offset. A surface which is composed of the constituent lines is generated as the fillet surface.

The conventional process poses no problem when a single fillet surface is generated with respect to curved surfaces of simple shape. However, if a plurality of fillet surfaces are to be generated between a plurality of curved surfaces of complex shape, such as of an automobile component made up of a set of complex free curved surfaces, then it is necessary to smoothly connect regions where fillet surfaces overlap or are spaced from each other. To meet the requirement, it was the general practice to make a product according to shape data, not processed for smoothly connecting such regions of the product, and then manually finish the product to smoothly connect those regions. Consequently, the practice was tedious and time-consuming.

A process for smoothly connecting a plurality of intersecting fillet surfaces has been proposed in "Development of a capability for generating a smooth corner surface with arbitrary number of boundaries", UNIVAC TECHNOLOGY REVIEW, No. 16, February 1988, pages 15–29.

According to the proposed process, when fillet surfaces 2a~2e are created between five curved surfaces 1a~1e as shown in FIG. 32 of the accompanying drawings, a corner surface area is produced as a joint area which is surrounded by points 3a~3e of intersection between the fillet surfaces 2a~2e as shown in FIG. 33 of the accompanying drawings. The corner surface area is divided into corner surfaces 6a~6e by lines which connect the center 4 of the corner surface area and middle points 5a~5e between the points 3a~3e of intersection, and curved surfaces are established as these corner surfaces 6a~6e.

If the fillet surfaces 2a~2e are created as shown in FIG. 34 of the accompanying drawings, then one corner surface 6a is of a reentrant polygonal shape as shown in FIG. 35 of the accompanying drawings, and it is difficult to establish a proper curved surface as the corner surface 6a. Furthermore, the joint area between the fillet surfaces 2a~2e shown in FIG. 33 or 35 is always divided into a plurality of corner surfaces 6a~6e, which are not smoothly connected to each other.

As shown in FIG. 36 of the accompanying drawings, when four curved surfaces 1f~1i are connected by convex edges 7a, 7d and concave edges 7b, 7c, fillet surfaces 2f~2i established along the respective edges 7a~7d are convex, concave, concave, and convex, respectively. A corner surface 6f created between these fillet surfaces 2f~2i has profile lines 8a, 8b which are of an inverted S shape and an S shape, respectively. If the corner surface 6f is generated using the profile lines 8a, 8b as a reference, then since the profile lines 8a, 8b are widely different in shape from each other, the corner surface 6f has a large surface undulation at its center.

According to a conventional process, as shown in FIG. 37 of the accompanying drawings, only a fillet surface B (an area surrounded by lines interconnecting points a7, a8, a9, a10) is formed between a curved surface A1 (an area surrounded by lines interconnecting points a1, a2, a3, a4) and a curved surface A2 (an area surrounded by lines interconnecting points a2, a5, a6, a3), and a phase relationship between the curved surfaces A1, A2 and the fillet surface B is not established.

The phase relationship is a piece of information representing how the curved surfaces A1, A2 and the fillet surface B are connected. For example, the curved surfaces A1, A2 have profile lines D1~D7, and a phase relationship representing that the curved surfaces A1, A2 are connected by the profile line D3 can be obtained from loop configurations, shown in FIG. 38 of the accompanying drawings, of the curved surfaces A1, A2.

However, a phase relationship representing that the curved surfaces A1, A2 are connected by profile lines D8, D9 of the fillet surface B cannot be obtained from a loop configuration which is established with respect to profile lines D8~D11 of the fillet surface B. According to the phase relationship shown in FIG. 38, therefore, an unwanted portion (an area surrounded by lines interconnecting the points a7, a2, a3, a10) of the curved surface A1 and an unwanted portion (an area surrounded by lines interconnecting the points a2, a8, a9, a3) of the curved surface A1 exist with the fillet surface B.

To provide a phase relationship between the curved surfaces A1, A2 and the fillet surface B, it has been the conventional practice for the operator to establish loop configurations, as shown in FIG. 39 of the accompanying drawings, with respect to a curved surface A1* composed of profile lines D1, D21, D8, D41 and a curved surface A2* composed of profile lines D9, D52, D6, D72. With the phase relationship thus provided, it is possible to recognize shape data of the curved surfaces A1*, A2* and the fillet surface B.

The above process is, however, highly tedious and time-consuming. When a complex shape composed of curved surfaces and fillet surfaces is to be analyzed, the operator needs a considerable period of time to understand the shape, and may possibly fail to produce accurate shape data.

SUMMARY OF THE INVENTION

It is a general object of the present invention to provide a method of generating shape data which includes fillet surface data capable of representing the complete shape of a product, easily and accurately from a surface model.

A major object of the present invention is to provide a method of generating shape data capable of smoothly connecting two curved surfaces and easily generating a joint surface.

Another object of the present invention is to provide a method of generating shape data capable of easily establishing profile lines of a joint surface which connects curved surfaces, without establishing a phase relationship between the curved surfaces.

Still another object of the present invention is to provide a method of generating shape data having a phase relationship easily from surfaces and a fillet surface established with respect to the surfaces.

A further object of the present invention is to provide a method of generating shape data capable of easily producing a joint surface which smoothly interconnects a plurality of fillet surfaces.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 38 is a diagram of loop configurations of curved and fillet surfaces shown in FIG. 37; and FIG. 39 is a diagram of a modification of the loop configurations shown in FIG. 38, illustrating a phase relationship established between the curved and fillet surfaces.

DETAILED DESCRIPTION OF THE PREFERRED EMBODIMENT

Figure 1:
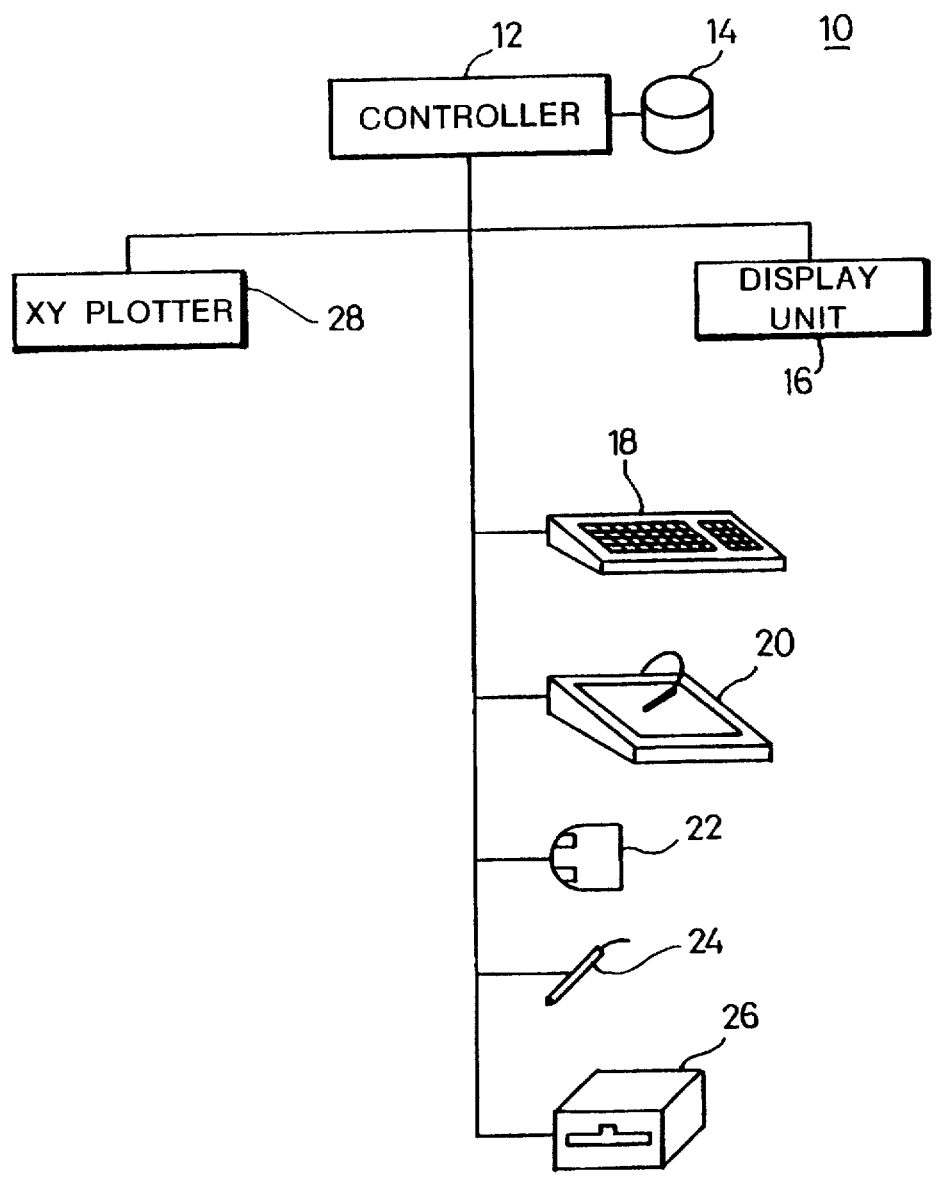
FIG. 1 is a diagram, partly in block form, a CAD system to which the present invention is applied.

FIG. 1 shows, partly in block form, a CAD system 10 to which the present invention is applied.

As shown in FIG. 1, the CAD system 10 comprises a controller 12 having a central processing unit for effecting graphic calculations, display control, and database management, a large-capacity memory 14 for storing and updating a large amount of graphic information, a graphic-compatible display unit 16 operable as a central device for assisting in interactive exchanges between the CAD system 10 and the operator, input devices including a keyboard 18, a tablet 20, a mouse 22, and a light pen 24, an external memory (CMT) 26, and an XY plotter 28 as a graphic output device.

Figure 2:
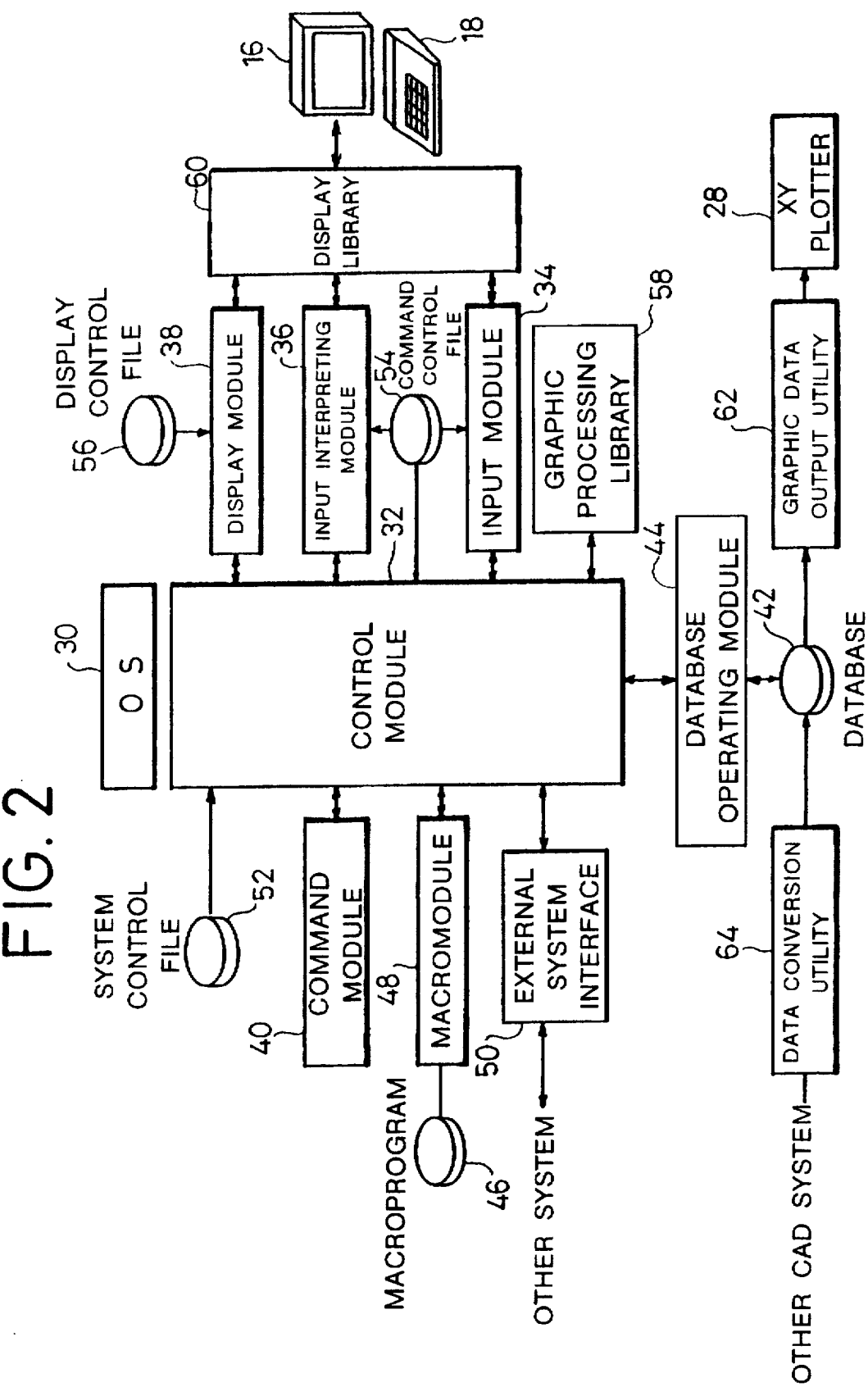
FIG. 2 is a block diagram of a controller in the CAD system shown in FIG. 1.

As shown in FIG. 2, the controller 12 has many programs which can be classified into the following modules according to functions performed thereby:

(a) an operating system 30 and a control module 32 for controlling the processing by the controller 12 and information flows;

(b) an input module 34 for assisting in smooth input operation of the various input devices, e.g., the keyboard 18;

(c) an input interpreting module 36 for interpreting entered information according to a format of commands;

(d) a display module 38 for managing display information and displaying information according to commands;

(e) a command module 40 for processing graphic data according to commands composed of submodules corresponding thereto;

(f) a database operating module 44 for efficiently retrieving and storing a large amount of information stored in a database 42 and required by the CAD system 10;

(g) a macromodule 48 for executing a macroprogram 46 which is an automatic designing program; and (h) an external system interface 50 for exchanging information and effecting linked operation with other CAD systems.

The controller 12 also has auxiliary files including a system control file 52 for storing configuration data and standard values of the CAD system 10 to maintain expansibility and maintainability thereof, a command control file 54 for storing operability data of commands and program control procedures, and a display control file 56 for storing type and configuration data of the display unit 16. The controller 12 further includes other auxiliary programs including a graphic processing library 58 for processing graphic data, a display library 60 for displaying data on the display unit 16, a graphic data output library 62 for outputting processed data to the XY plotter 28, and a data conversion utility 64 for allowing the CAD system 10 to be connected to other CAD systems.

The above modules will briefly be described below. The control module 32 converts the programs into modules and is present between the modules for centralized management of control processes in the system and standardization of calling sequences. The functions of the control modules 32 include start, end, failure processing, controlling of execution of the modules, recording of an execution history, debugging, and special processing between itself and the operating system 30.

The input module 34 serves to give the operator a comfortable input sequence according to organized and unified specifications of the various input devices. The functions of the input module 34 include input prompting for indicating, to the operator, a type of information to be inputted, a method of inputting information, and an input device to be used, selection of an input device, and conversion of input information into a standard type.

The input interpreting module 36 unifies methods of interpreting input information and displaying of interpreted results to support various input methods for improving input operations, and also to maintain system expansibility. The functions of the input interpreting module 36 include interpretation of input information and displaying of interpreted results.

The display module 38 serves to uniformly process a wide variety of display control requests, and manage the display unit, control the display process, manage display information, and manage display conditions.

The command module 40 effects centralized management of types of input arguments, calling of a processing program according to commands, and methods of processing results, and maintains system maintainability and expansibility.

The database operating module 44 serves to standardize methods of requesting from the other modules and provides data recovery upon occurrence of faults. The functions of the database operating module 44 include management of a status of usage of the database 42, operation of the database 42, and processing upon occurrence of faults.

The external system interface 50 standardizes reception of information from and transmission of information to other systems for effective utilization of the CAD system 10. The functions of the external system interface 50 include reception of information from and transmission of information to external systems, and controlling of operation of external programs.

The macromodule 48 controls the execution of the CAD system 10 according to the macroprogram 46 which is generated. The functions of the macromodule 48 include translation and execution of the macroprogram 46.

A process of generating shape data to form fillet surfaces for a surface model thereby to generate NC machining data in the CAD system 10 which has the above programs will be described below.

Figure 3:
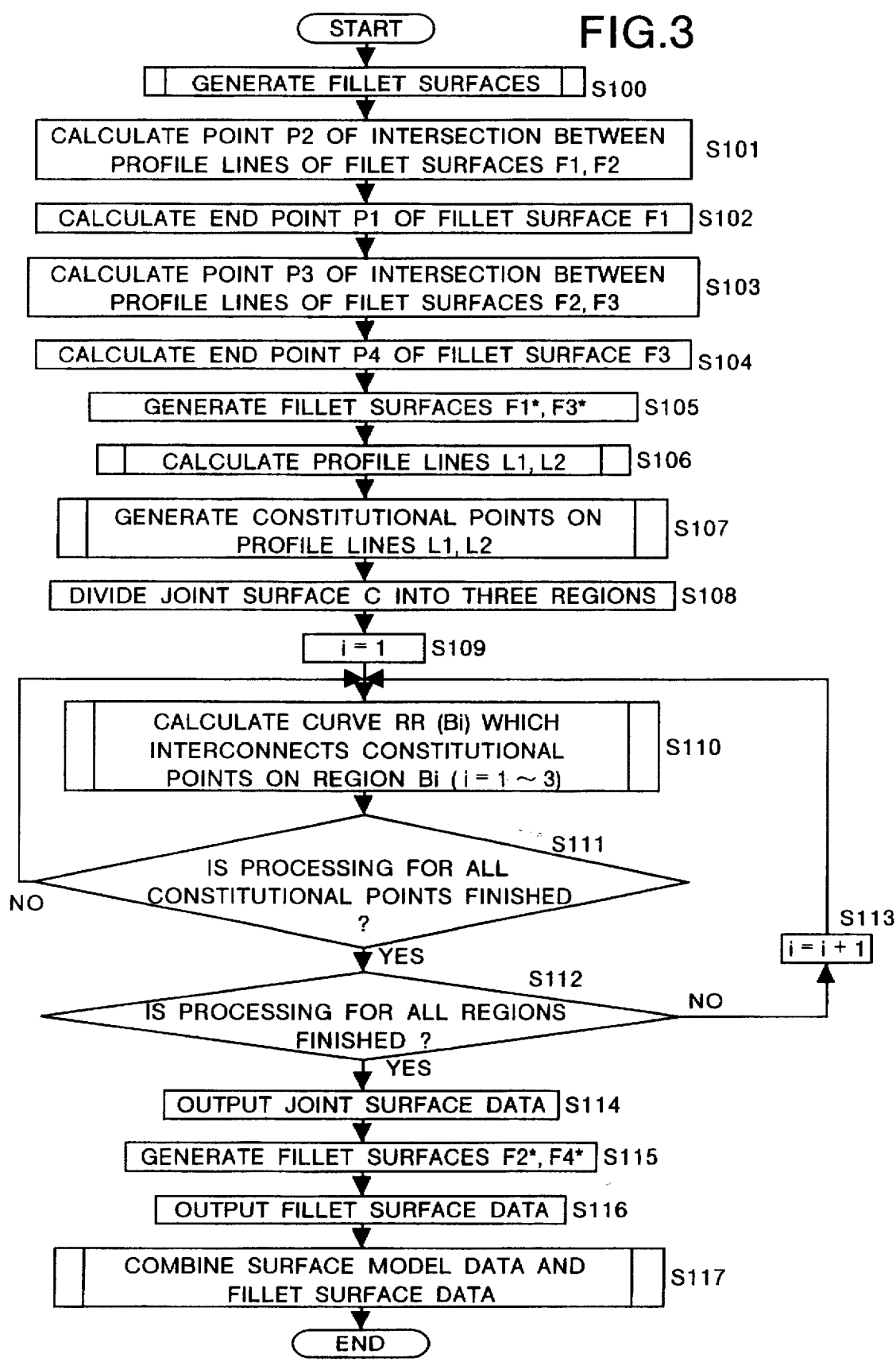
FIG. 3 is a flowchart of a process of generating shape data.

FIG. 3 shows such a process of generating shape data. FIGS. 4 through 11 illustrate processing sequences of the process of generating shape data.

Figure 4:
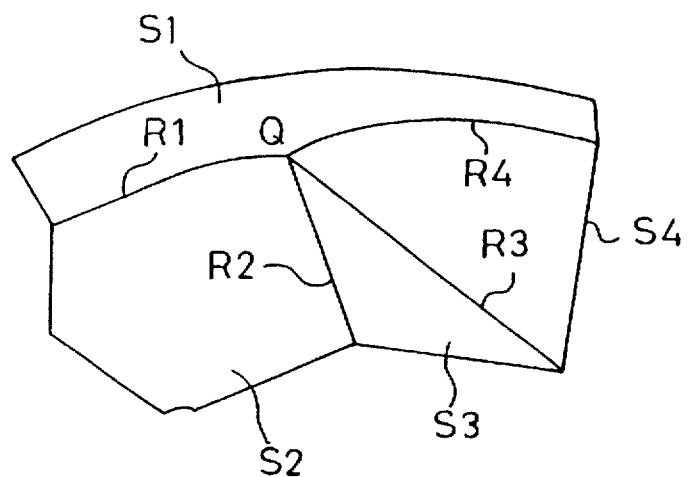
FIG. 4 is a diagram showing a surface model.

Data representing a surface model shown in FIG. 4 is read from the large-capacity memory 14 (see FIG. 1). As shown in FIG. 4, the surface model is composed of a plurality of curved surfaces S1~S4 connected by a plurality of edges R1~R4. Each of the curved surfaces S1~S4 has a phase relationship as shown in FIG. 3B. Fillet surfaces F1~F4 shown in FIG. 5 are generated with respect to the edges R1~R4 between the curved surfaces S1~S4 in a step S100.

Figure 12:
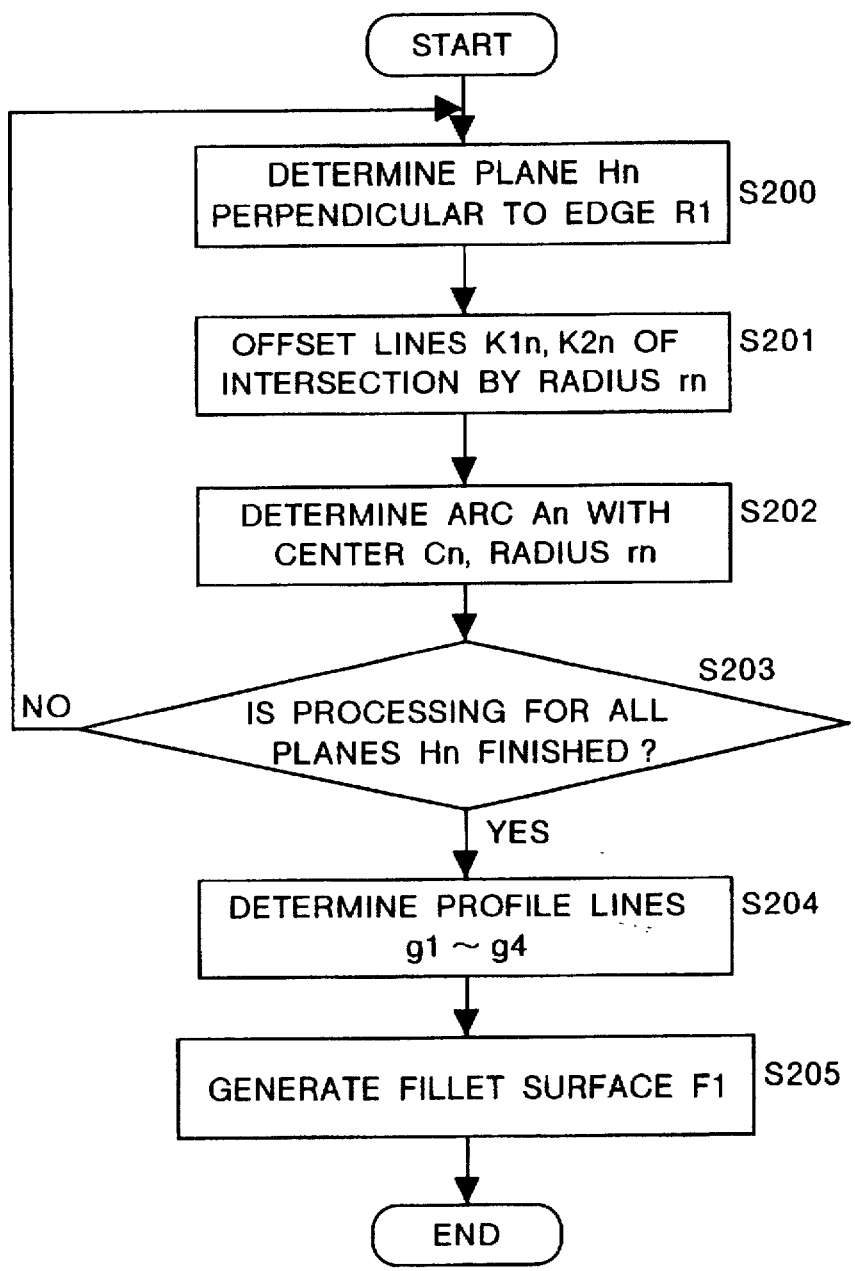
FIG. 12 is a flowchart of a process of generating a fillet surface.
Figure 13:
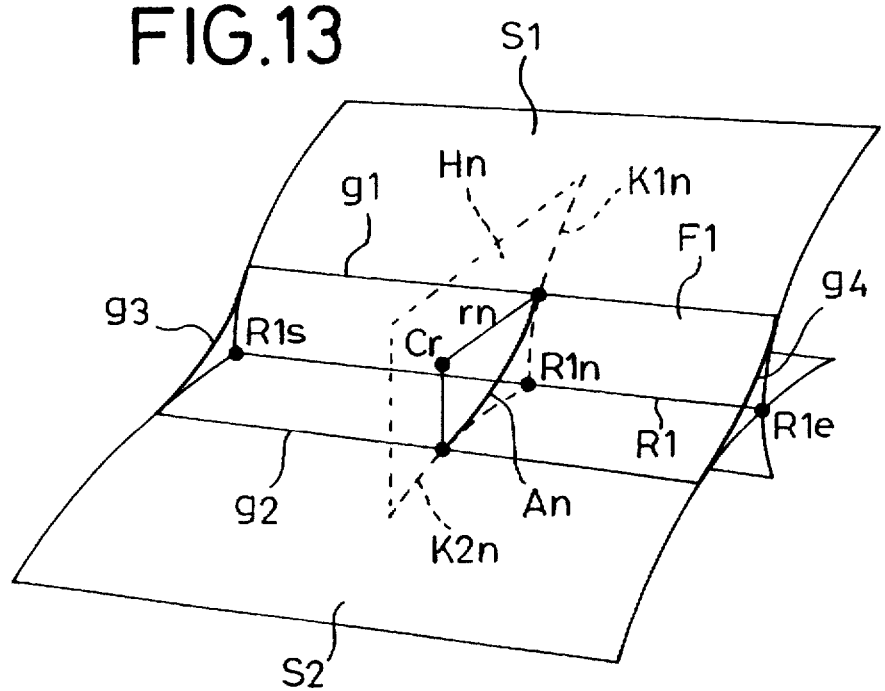
FIG. 13 is a diagram illustrative of the process of generating the fillet surface shown in FIG. 12.

FIG. 12 shows a process of generating the fillet surface F1, and FIG. 13 is illustrative of the process of generating the fillet surface F1. First, a plane Hn which extends through a point R1n on the edge R1 and perpendicularly to the edge R1 is determined in a step S200. Then, lines K1n, K2n of intersection between the plane Hn and the curved surfaces S1, S2 are determined, and offset on the plane Hn by a radius rn, determining a center Cn of an arc An in a step S201. Then, the arc An with the radius rn is determined from the center Cn in a step S202. The above processing is carried out with respect to all planes Hn that are established at given intervals between end points R1s, R1e of the edge R1 in a step S203. Thereafter, profile lines g1, g2 which smoothly connect points where the arcs An contact the curved surfaces S1, S2, and profile lines g3, g4 which comprise arcs An that are aligned with the end points R1s, R1e of the edge R1 are determined in a step S204. Finally, a surface is generated as the fillet surface F1 in a region surrounded by the profile lines g1, g2, g3, g4 and defined by the arcs An, according to the Coons formula, for example, in a step S205. The other fillet surfaces F2~F4 are generated in the same manner as described above.

Figure 5:
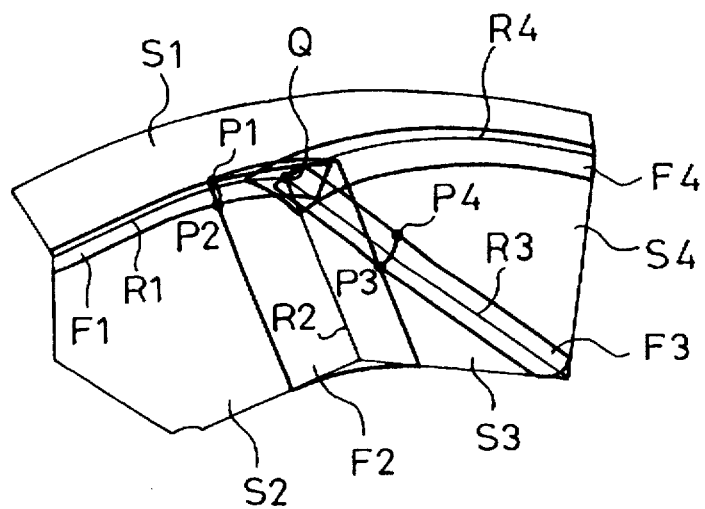
FIG. 5 is a diagram showing fillet surfaces established on the surface model shown in FIG. 4.

As shown in FIG. 5, the fillet surfaces F1~F4 thus generated overlap each other in the vicinity of a point Q where the edges R1~R4 meet, and cannot produce a smooth surface as they are. Therefore, a joint surface for smoothly connecting the fillet surfaces F1~F4 is generated.

Figure 6:
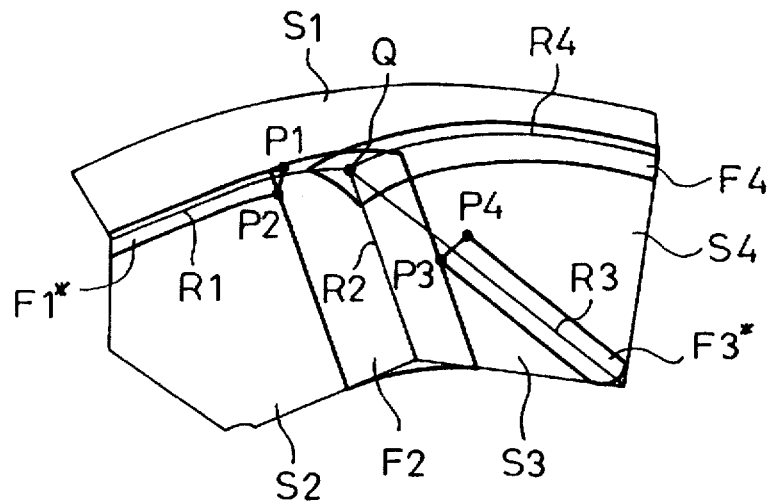
FIG. 6 is a diagram showing fillet surfaces severed by arcs to generate new fillet surfaces.

As shown in FIG. 5, a point P2 of intersection between a profile line (corresponding to the profile line g2 shown in FIG. 13) of the fillet surface F1 and a profile line of the fillet surface F2 is determined in a step S101. Since the point P2 is positioned on the curved surface S2, it can easily be determined as a point of intersection between the above two profile lines. Then, a point where an arc (corresponding to the arc An shown in FIG. 13) passing through the point P2 and positioned on the fillet surface F1 contacts the curved surface S1 is determined as a point P1 in a step S102. Similarly, a point P3 of intersection between a profile line of the fillet surface F2 and a profile line of the fillet surface F3 is determined in a step S103. Then, a point where an arc passing through the point P3 and positioned on the fillet surface F3 contacts the curved surface S4 is determined as a point P4 in a step S104. As shown in FIG. 6, the fillet surface F1 is severed by the arc between the points P1, P2, generating a new fillet surface F1*, and the fillet surface F3 is severed by the arc between the points P3, P4, generating a new fillet surface F3* in a step S105.

Figure 7:
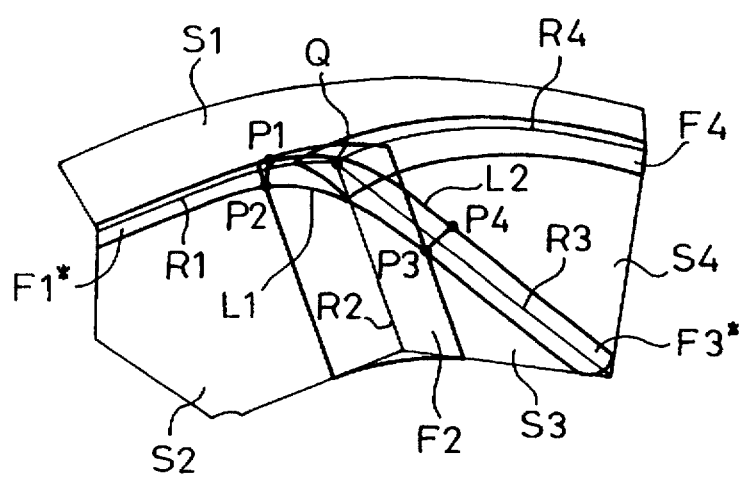
FIG. 7 is a diagram showing profile lines of a joint surface established between the fillet surfaces.
Figure 8:
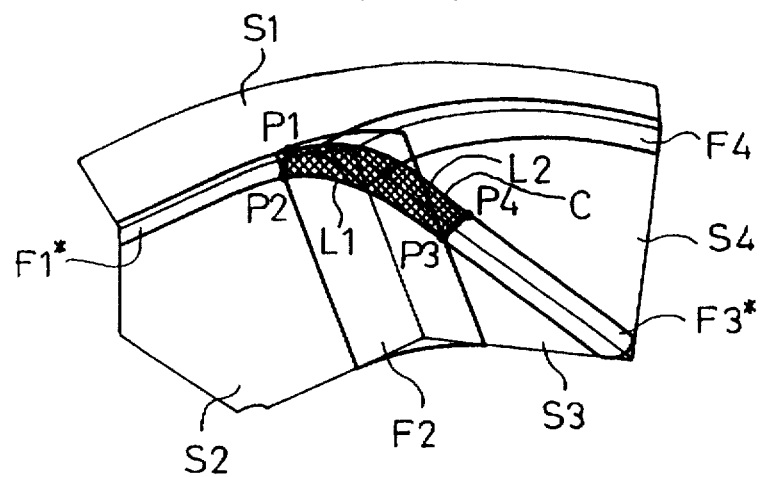
FIG. 8 is a diagram showing the joint surface established between the fillet surfaces.
Figure 9:
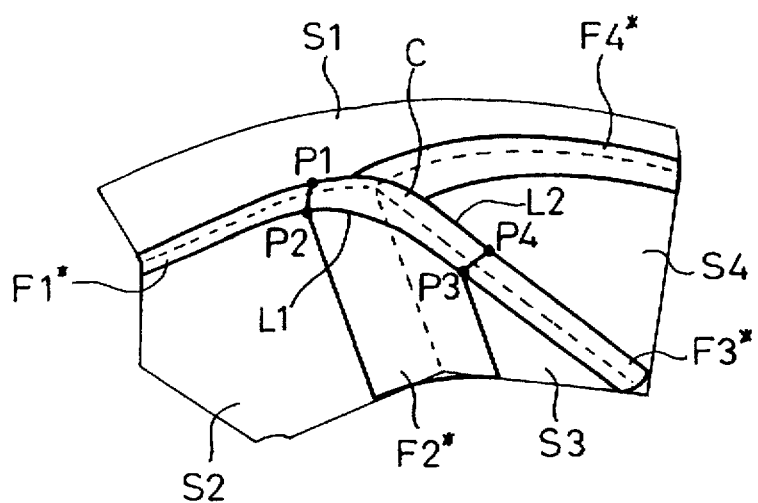
FIG. 9 is a diagram showing fillet surfaces established on the surface model.
Figure 10:
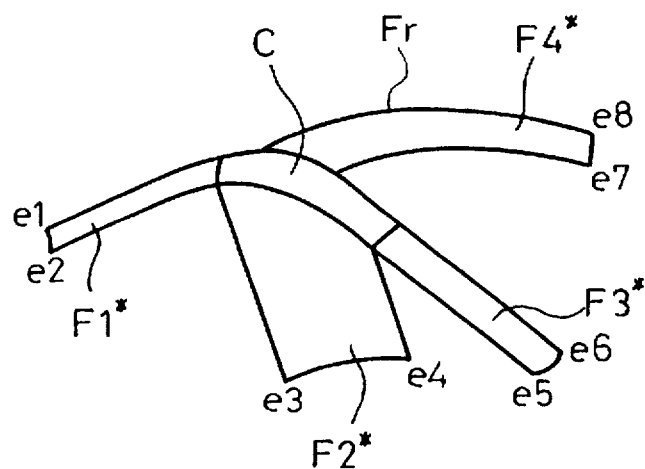
FIG. 10 is a diagram showing fillet model data representing a fillet model.

Then, as shown in FIG. 7, a profile line L1 for smoothly connecting the points P1, P2 and a profile line L2 for smoothly connecting the points P2, P3 are determined in a step S106.

Figure 14:
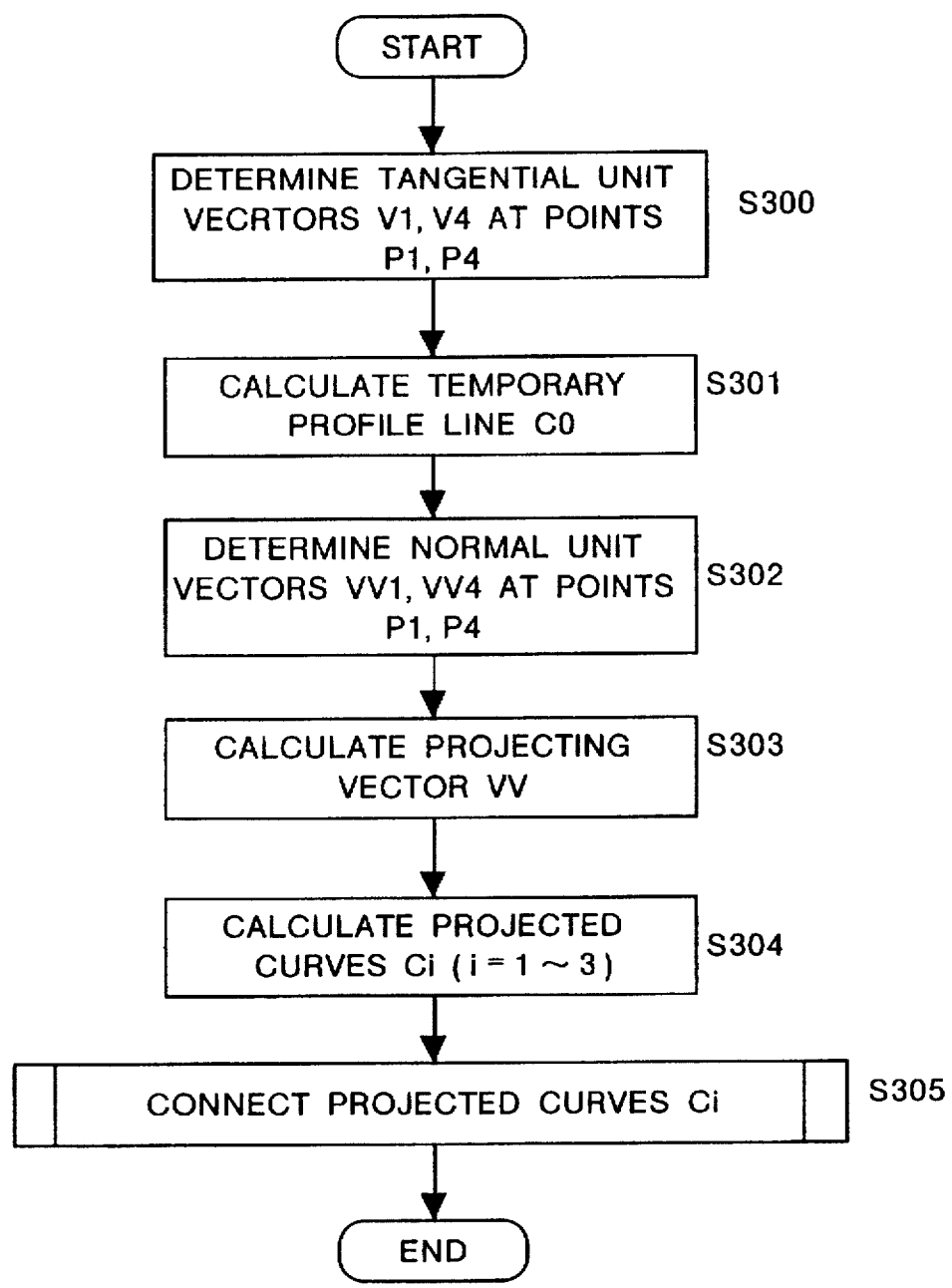
FIG. 14 is a flowchart of a process of determining projected curves which make up a profile line of a joint surface.
Figure 15:
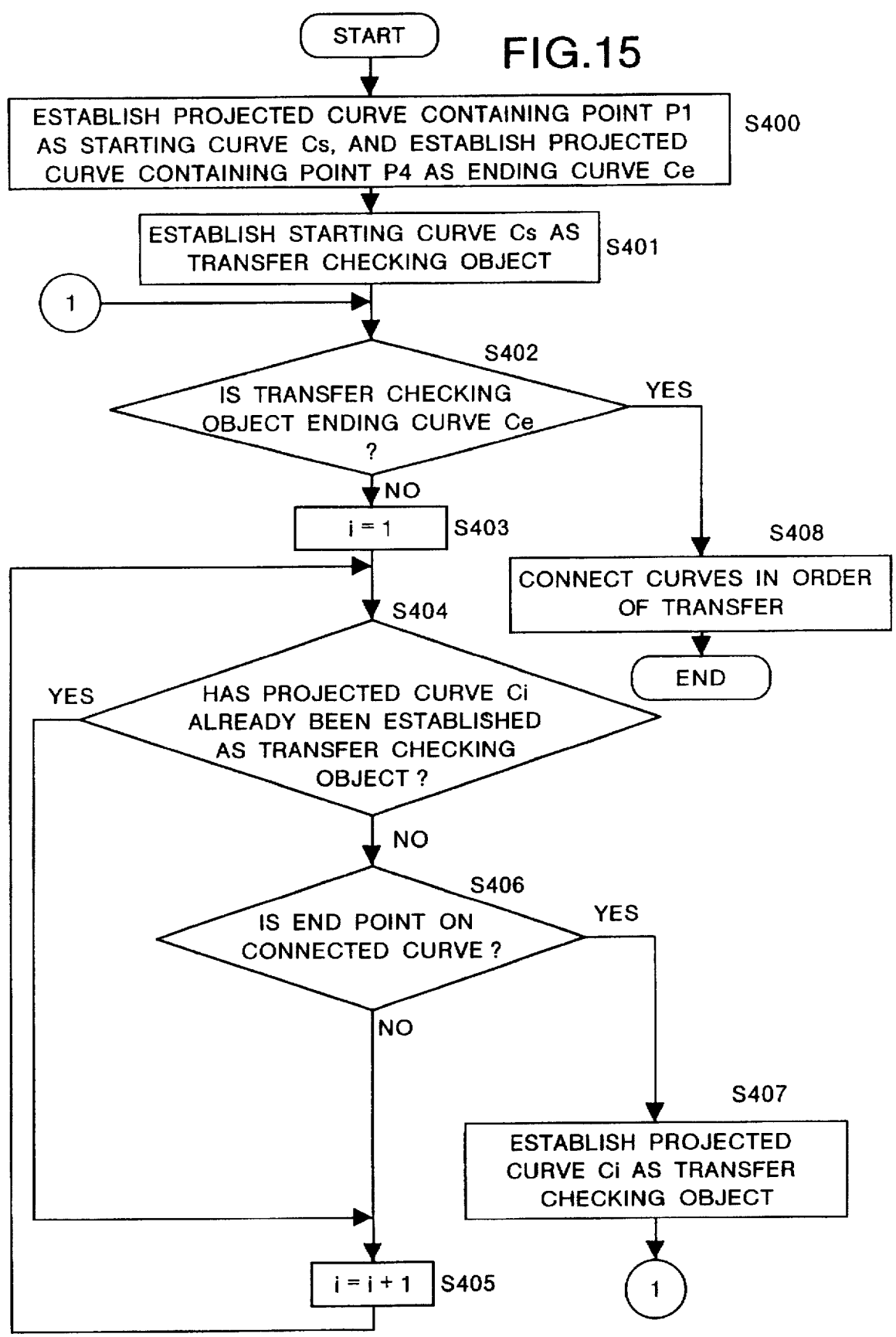
FIG. 15 is a flowchart of a process of connecting projected curves to determine a profile line of a joint surface.
Figure 16:
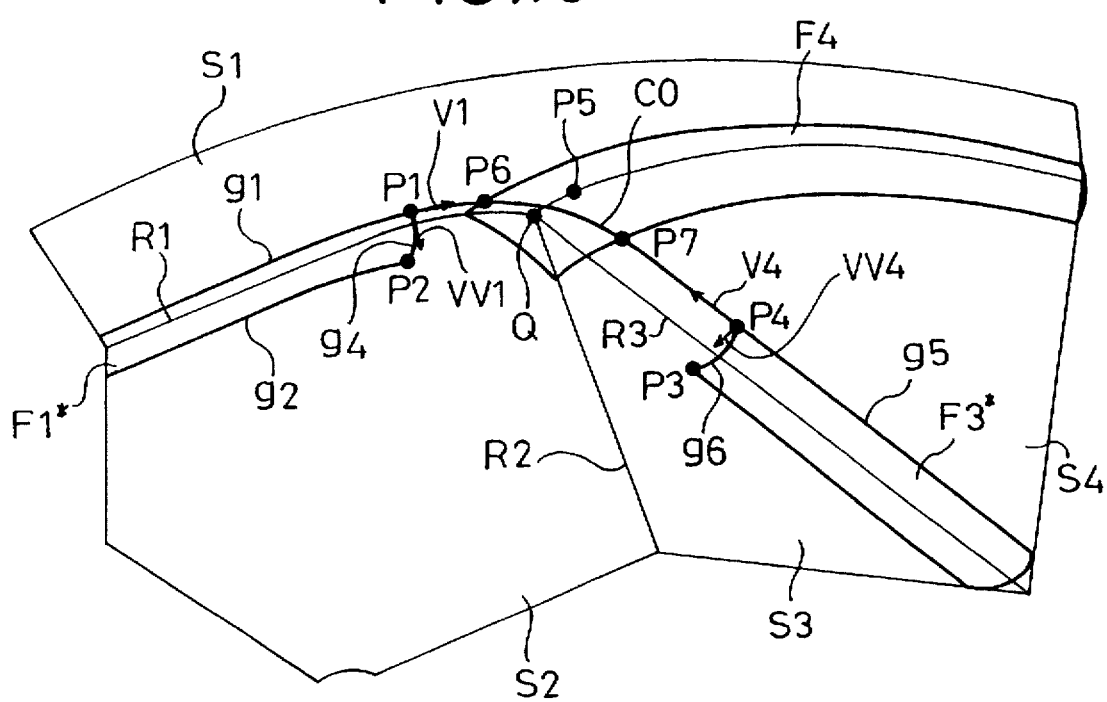
FIG. 16 is a diagram illustrating a process of generating projected curves.
Figure 17:
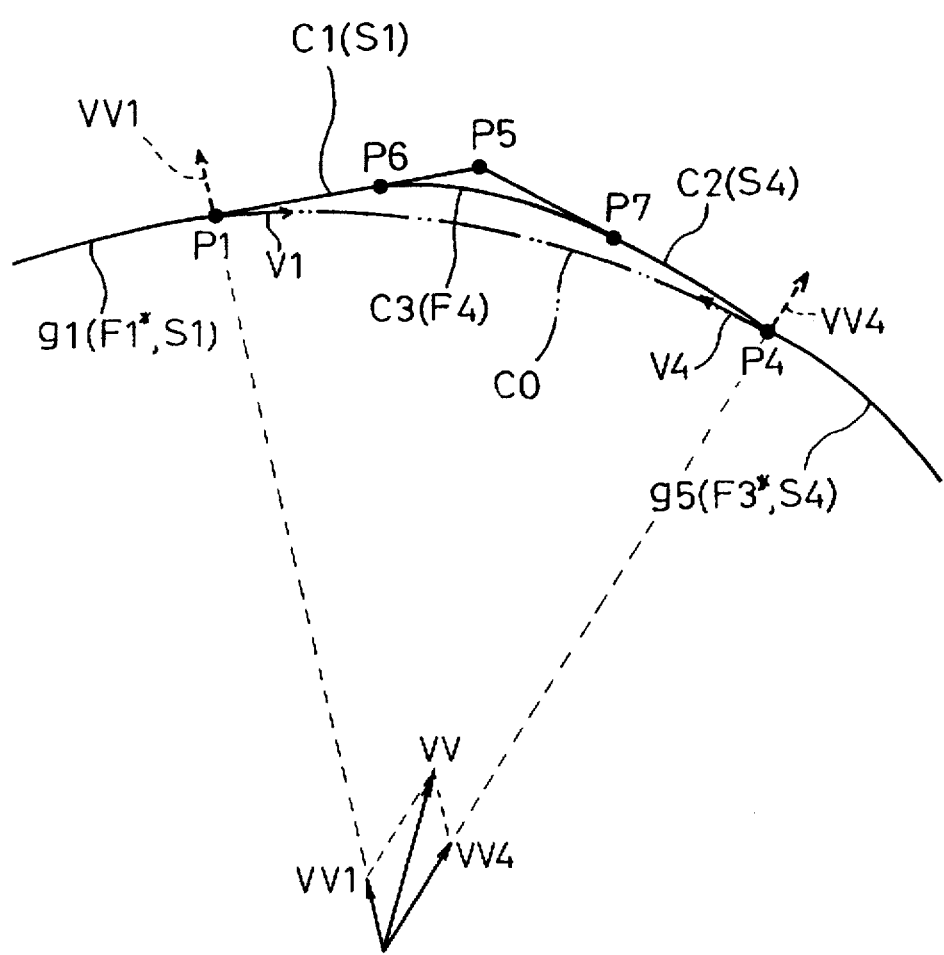
FIG. 17 is a diagram illustrating the process of generating projected curves.
Figure 18:
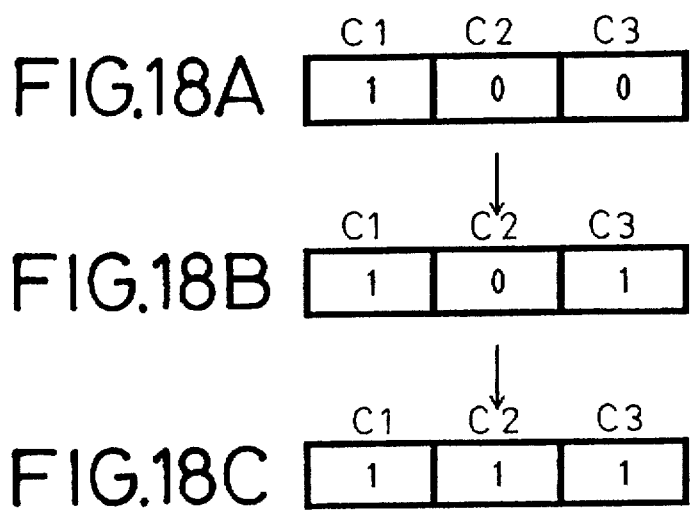
FIGS. 18A, 18B and 18C are diagrams illustrating the process of generating projected curves.

FIGS. 14 and 15 show subroutines for determining the profile line L1, and FIGS. 16 through 18 illustrate these subroutines. As shown in FIG. 16, a unit vector V1 tangential to a profile line g1 of the fillet surface F1* which passes through the point P1 is determined, and a unit vector V4 tangential to a profile line g5 of the fillet surface F3* which passes through the point P4 is determined in a step S300 shown in FIG. 14. Then, a temporary profile line C0 for smoothly connecting the profile lines g1, g5 is determined using the tangential vectors V1, V2 and the coordinates of the points P1, P4 in a step S301. Since the temporary profile line C0 is established based on only the condition of being held in contact with the profile lines g1, g5, the temporary profile line C0 is generally not aligned with the desired profile line L1, as shown in FIG. 17.

Thereafter, a unit vector VV1 which passes through the point P1 and is normal to the curved surface S1, and a unit vector VV4 which passes through the point P4 and is normal to the curved surface S4 are determined in a step S302. These normal unit vectors VV1, VV4 are combined into a projecting vector VV in a step S303. Using the projecting vector VV, the temporary profile line C0 is projected onto the curved surfaces S1, S4 and the fillet surface F4, thereby determining projected curves C1, C2, C3 (see FIG. 17) thereon in a step S304. As shown in FIG. 17, the projected curve C1 is generated between the point P1 which is an end point of the fillet surface F1* and a point P5 which is an end point on the edge R4. The projected curve C2 is generated between the point P5 and the point P4 which is an end point of the fillet surface F3*. The projected curve C3 is generated between points P6, P7 on the fillet surface F4. The projected curves C1~C3 thus determined are connected according to the subroutine shown in FIG. 15, thereby determining the profile line L1 in a step S305.

In the subroutine shown in FIG. 15, the projected curve containing the point P1 is established as a starting curve Cs (projected curve C1), and the projected curve containing the point P4 is established as an ending curve Ce (projected curve C2) in a step 400. Then, the starting curve Cs (projected curve C1) is established as a transfer checking object to be transferred from the profile line g1 shown in FIG. 17, and a flag is set for the starting curve Cs (projected curve C1) in a step S401. It is now determined whether the present transfer checking object is the ending curve Ce (projected curve C2) or not in a step S402. If the present transfer checking object is not the ending curve Ce, then i is set to i=1 in a step S403, and it is determined whether the projected curve Ci has already been established as a transfer checking object or not, i.e., whether a flag has already been set for the projected curve Ci, in a step S404. Since the flag has already been set for the projected curve C1, i is set to i=i+1 in a step S405, and the flag for the projected curve Ci is checked in the step 404. At this time, no flag is set for the projected curve C2 (see FIG. 18A). Therefore, it is determined whether the projected curve C2 is smoothly connected to the projected curve C1 which has been established as a transfer checking object in the preceding cycle in a step S406. Inasmuch as the projected curve C2 is connected unsmoothly to the projected curve C1 at the point P5, i is set to i=i+1 in the step S405, and the step S404 is repeated. At this time, since no flag is set for the projected curve C3 (see FIG. 18A), the step S406 is executed. Because the projected curve C3 is smoothly connected to the projected curve C1 which has been established as a transfer checking object in the preceding cycle, the projected curve C3 is established as a transfer checking object in a step S407, and a flag is set for the projected curve C3 (see FIG. 18B). Thereafter, the step S402 and following steps are repeated. Since the present transfer checking object is the projected curve C3, but not the ending curve Ce, in the step S402, the step S403 and following steps are executed. In the step S406, the projected curve C2 is smoothly connected to the projected curve C3 which has been established as a transfer checking object in the preceding cycle. Therefore, the projected curve C2 is established as a transfer checking object in the step S407, and a flag is set for the projected curve C2 (see FIG. 18C). Then, the step S402 is executed again. Since the transfer checking object is the ending curve Ce at this time, the projected curves are connected in the order of C1→C2→C3 based on the flags set in the order shown in FIGS. 18A, 18B and 18C in a step S408, thereby generating the profile line L1. The profile line L2 can be generated in the same manner as described above.

Consequently, the profile line L1 can automatically generated on the curved surfaces S1, S4 and the fillet surface F4 without establishing phase relationships representing which curves are connected to which curves with respect to the curved surfaces S1~S4 and the fillet surfaces F1~F4.

Figure 19:
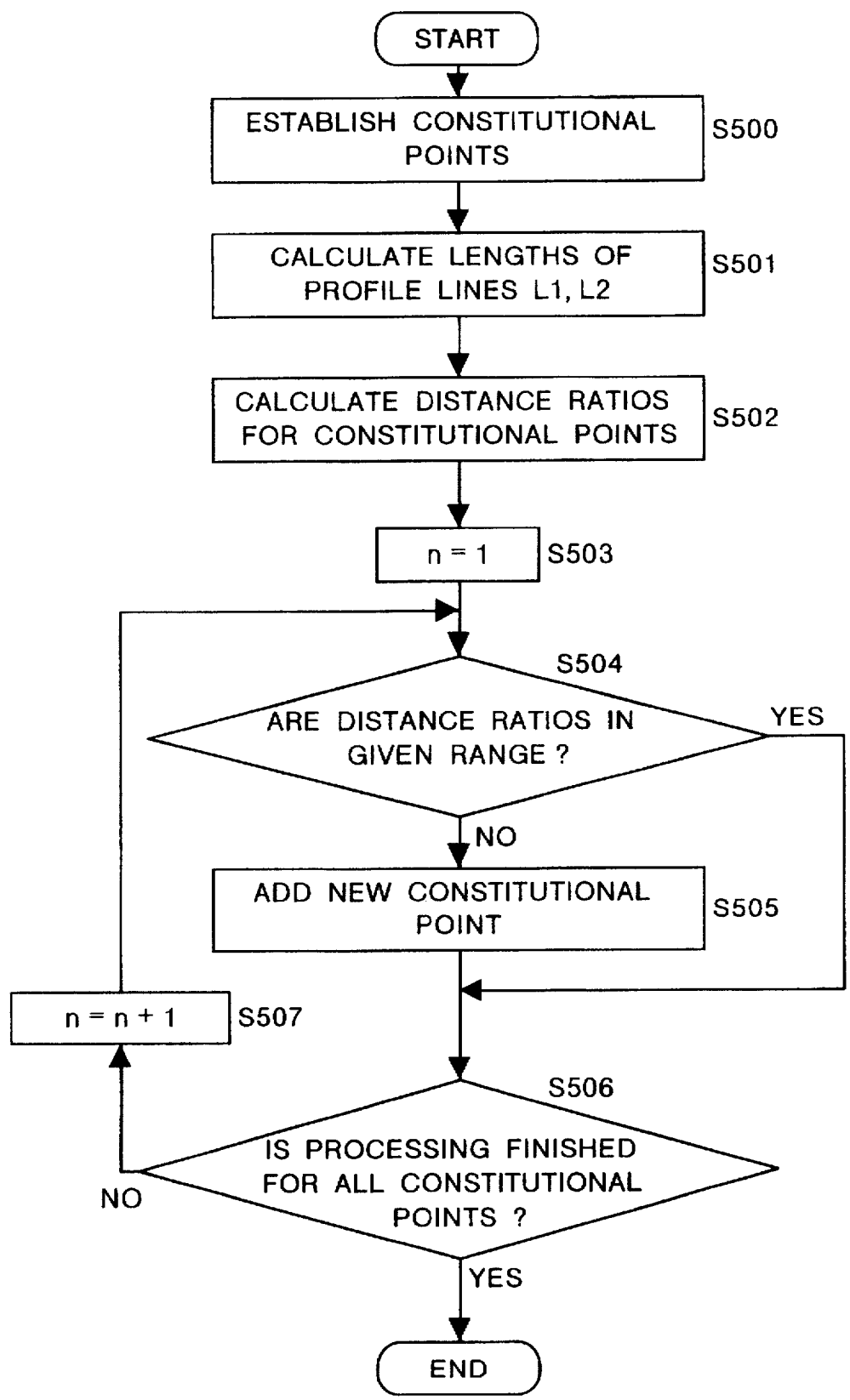
FIG. 19 is a flowchart of a process of establishing constitutional points on profile lines of a joint surface.

In order to generate a joint surface C (see FIG. 8) surrounded by a profile line g4 (see FIG. 16) established between the points P1, P2 of the fillet surface F1*, a profile line g6 (see FIG. 16) established between the points P3, P4 of the fillet surface F3*, and the profile lines L1, L2 generated by the above process, constitutional points are generated at given intervals on the profile lines L1, L2 in a step S107 shown in FIG. 3. A process of generating constitutional points will be described below with reference to FIGS. 19, 20, and 21.

Figure 20:
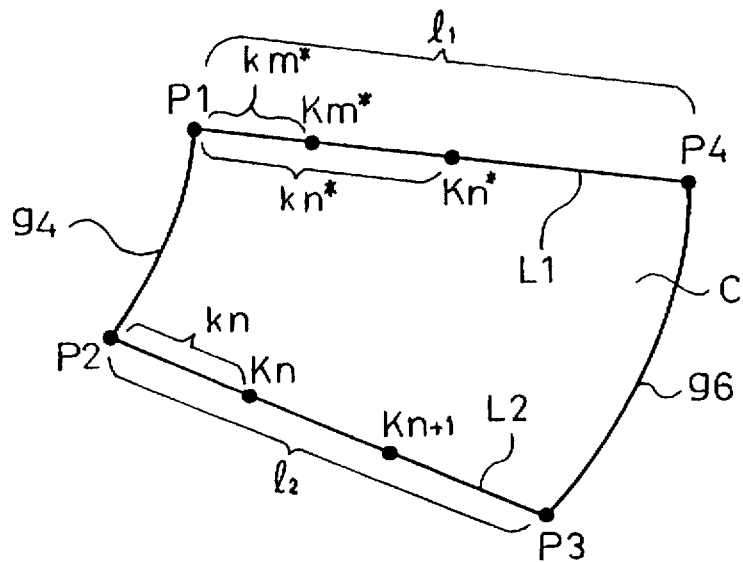
FIG. 20 is a diagram illustrating the process of establishing constitutional points on profile lines of a joint surface.
Figure 21:
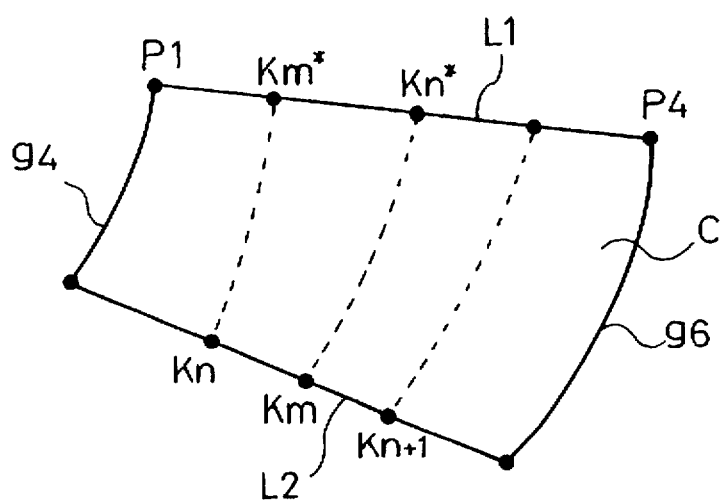
FIG. 21 is a diagram illustrating the process of establishing constitutional points on profile lines of a joint surface.

As shown in FIG. 20, a plurality of constitutional points Kn*, Kn are established on the profile lines L1, L2 depending on the curvature, etc., of the profile lines L1, L2 in a step S500. Then, lengths $l_1$, $l_2$ of the profile lines L1, L2 are calculated in a step S501. Distance ratios kn*/$l_1$, kn/$l_2$ of the distances kn*, kn between the points P1, P2 and the constitutional points Kn*, Kn to the lengths $l_1$, $l_2$ are determined in a step S502. Thereafter, n is set to n=1 in a step S503. If the distance ratios kn*/$l_1$, kn/$l_2$ are not within a predetermined range, i.e., do not satisfy the relationship:

$$kn*/l_1 = kn/l_2$$

in a step S504, then a new constitutional point Km* is added between the point P1 and the constitutional point Kn*, for example, in a step S505. The above processing is carried out with respect to all the constitutional points in steps S506, S507, and sets of corresponding constitutional points (e.g., the constitutional points Kn*, Km shown in FIG. 21) are established. In this manner, the same number of constitutional points spaced at substantially equal intervals are established on each of the profile lines L1, L2.

Figure 22:
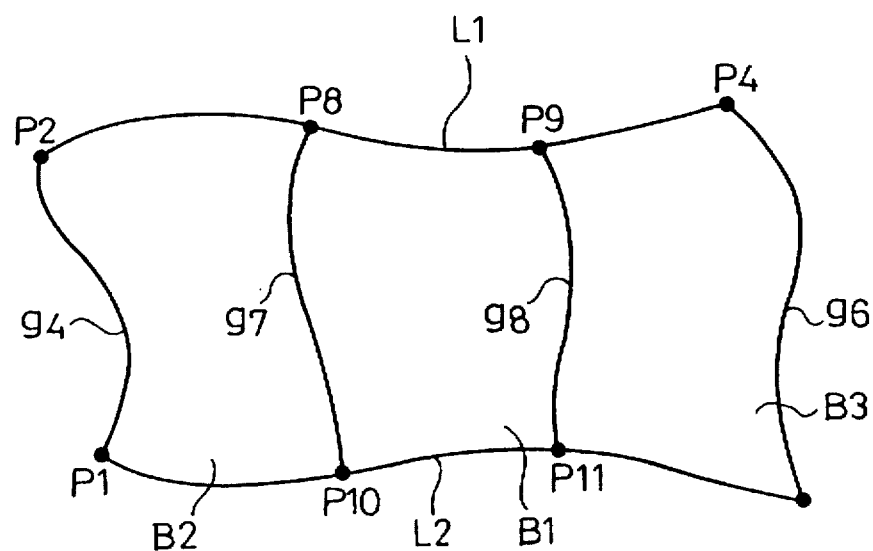
FIG. 22 is a diagram of regions produced by dividing a joint surface.

When the profile lines g4, g6 of the joint surface C have widely different shapes, such as an inverted S shape and an S shape, respectively, as shown in FIG. 22, if the curved joint surface C is generated using boundary conditions at the profile lines g4, g6, then the joint surface C tends to suffer poor matching in its central region.

To avoid the above drawback, the joint surface C with the constitutional points established thereon in the manner described above is divided into three regions B1, B2, B3 (see FIG. 22) in a step S108 shown in FIG. 3. After i is set to i=1 in a step S109, a curved surface is established with respect to the central region B1 (Bi=B1) in steps S110, S111, S112, and then curved surfaces are generated for the regions B2, B2 (Bi=2, 3) using the curvature information of the region B1 in a step S113. The difference between the shapes of the profile lines g4, g6 is absorbed by profile lines g7, g8 of the central region B1, so that the joint surface C can smoothly connect the fillet surfaces F1*, F3* to each other.

A process of generating a curve which interconnects constitutional points in a central region produced by dividing a joint surface will be described below with reference to FIGS. 23, 24, and 25. In the process, a curve RR (B1) is generated between the constitutional points Kn*, Km that are determined in the step S107 with respect to the region B1.

Figure 23:
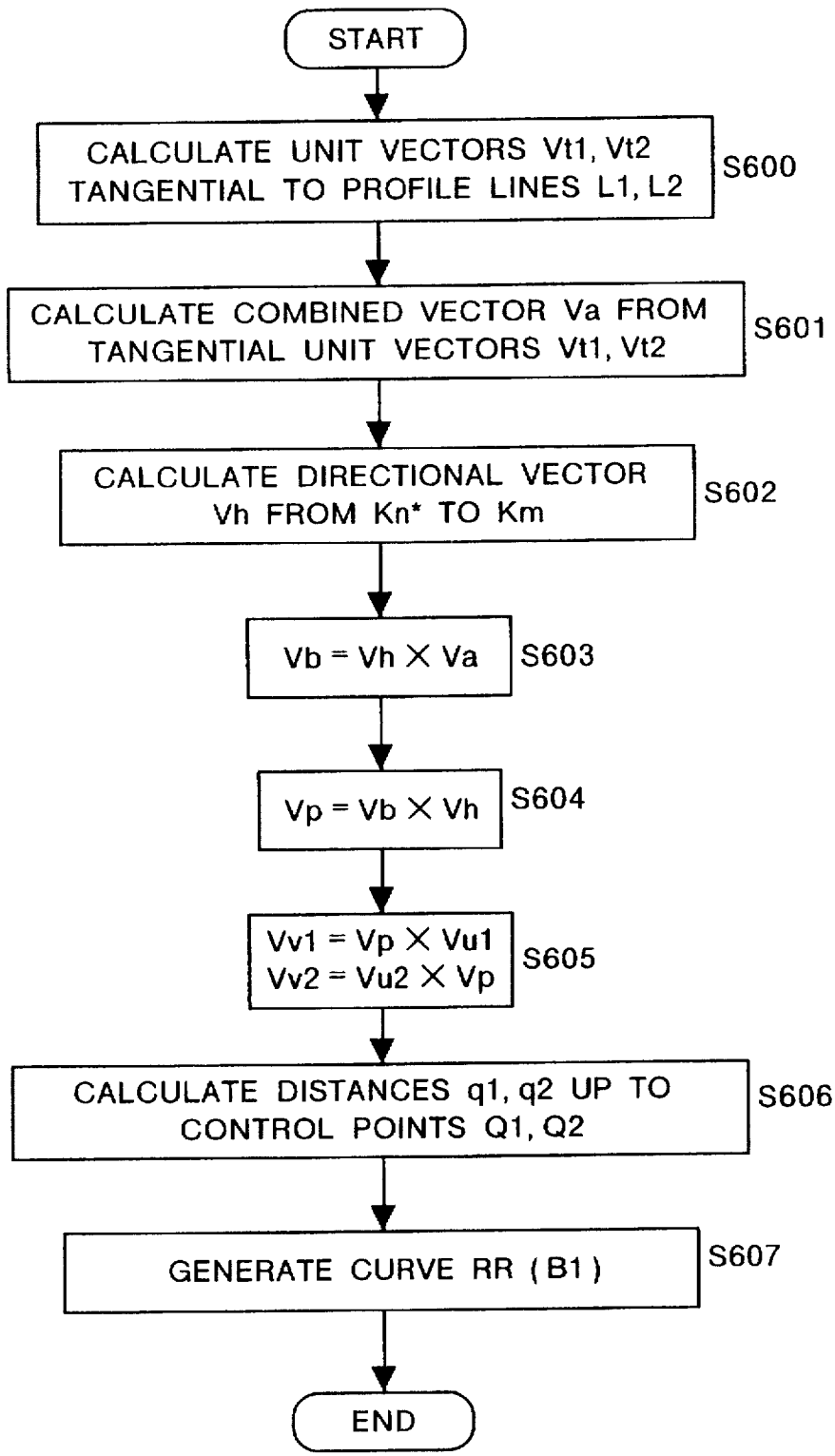
FIG. 23 is a flowchart of a process of generating a curve which interconnects constitutional points in a central region produced by dividing a joint surface.
Figure 24:
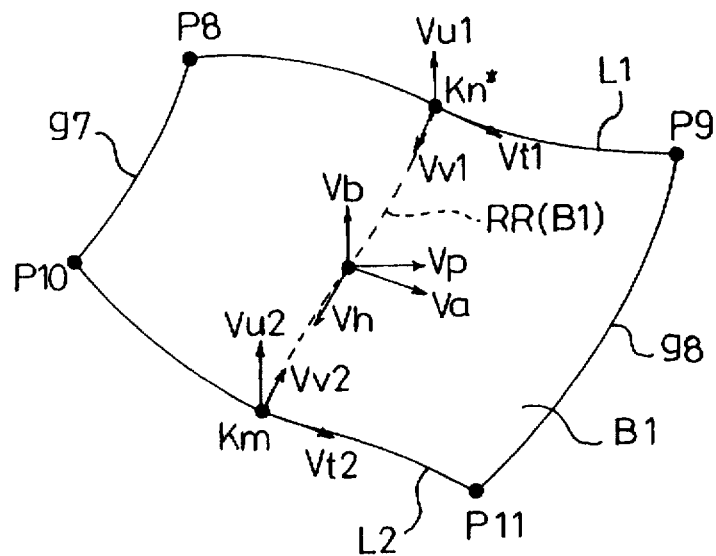
FIG. 24 is a diagram illustrating the process of generating a curve which interconnects constitutional points in a central region produced by dividing a joint surface.
Figure 25:
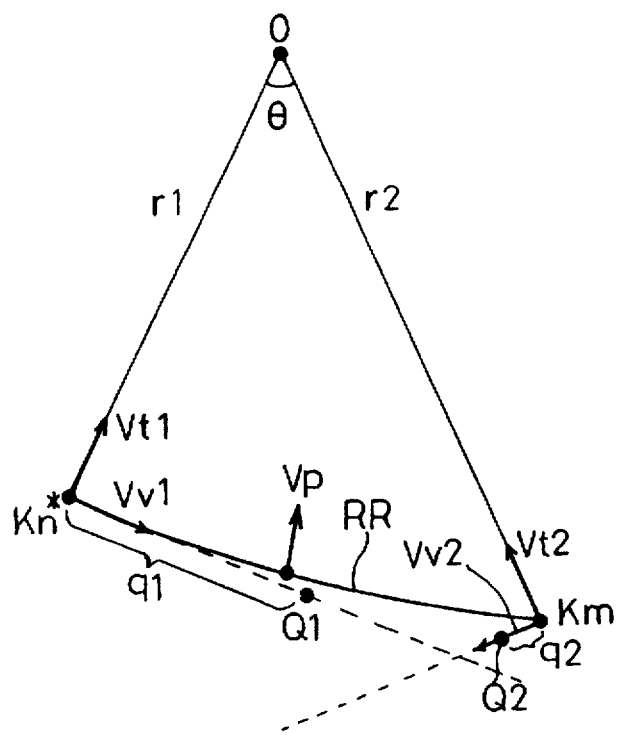
FIG. 25 is a diagram illustrating the process of generating a curve which interconnects constitutional points in a central region produced by dividing a joint surface.

First, as shown in FIG. 24, unit vectors Vt1, Vt2 tangential to the profile lines L1, L2, respectively, are determined at the constitutional points Kn*, Km between points P8, P9 and points P10, P11 of the region B1 in a step S600 shown in FIG. 23. Then, the tangential unit vectors Vt1, Vt2 are combined into a vector Va in a step S601, and a directional unit vector Vh oriented from the constitutional point Kn* toward the constitutional point Km is determined in a step S602. Thereafter, a vector Vb which is the outer product of the directional unit vector Vh and the combined vector Va is determined in a step S603, and then a vector Vp which is the outer product of the vector Vb and the directional unit vector Vh is determined in a step S604. A vector Vv1 which is the outer product of the vector Vp and a vector Vu1 normal to the profile line L1 at the constitutional point Kn*, and a vector Vv2 which is the outer product of the vector Vp and a vector Vu2 normal to the profile line L2 at the constitutional point Km are determined in a step S605. These vectors Vv1, Vv2 are tangential to a curve RR (B1) at the respective constitutional points Kn*, Km, as shown in FIG. 24.

The curve RR (B1), which comprises a Bezier curve, is determined using the tangential vectors Vv1, Vv2. At this time, as shown in FIG. 25, control points Q1, Q2 are established on extensions of the vectors Vv1, Vv2, and distances q1, q2 from the constitutional points Kn*, Km to the control points Q1, Q2 are calculated in a step S606 according to the following equation (1):

$$q_i = 4 \cdot (1 - \cos(\theta/2)) \cdot r_j / 3 \cdot \sin(\theta/2) \quad (1)$$

$$(i=1\sim2, \theta \neq 0, j=3-i)$$

where r1, r2 represent the distances from the point O of intersection of the tangential unit vectors Vt1, Vt2 to the respective constitutional points Kn*, Km, and θ represents the central angle of the sector O–Kn*–Km. The curve RR (B1) is generated using the control points Q1, Q2 in a step S607.

The above processing is carried out with respect to all the sets of constitutional points of the region B1 in a step S111 shown in FIG. 3. Now, all curves Rr (B1) on the region B1 are established, thus defining the region B1.

Figure 26:
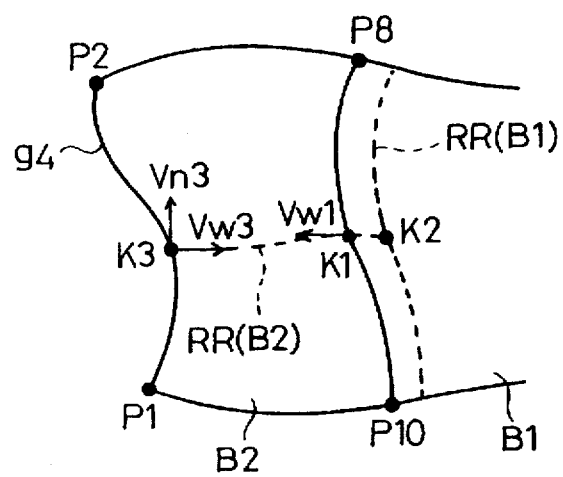
FIG. 26 is a diagram illustrating a process of generating a curve which interconnects constitutional points in end regions produced by dividing a joint surface.
Figure 27:
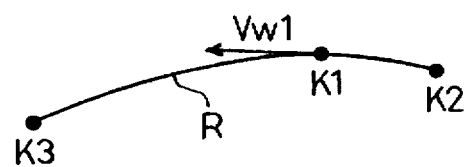
FIG. 27 is a diagram illustrating a process of generating a vector tangential to a curve in end regions produced by dividing a joint surface.

After the region B1 is determined, a curve RR (B2) with respect to the region B2 is established. It is assumed that a curve RR (B2) is established between constitutional points K1, K3 in the region B2 as shown in FIGS. 26 and 27.

As with the steps S600~S605, a vector Vw3 in the direction of the curve RR (B2) with respect to the constitutional point K3 is determined. A vector Vw1 in the direction of the curve RR (B2) with respect to the constitutional point K1 is determined as shown in FIG. 27 using a constitutional point K2 on the curve RR (B1), determined in the step S607, adjacent to the constitutional point K1. Specifically, as shown in FIG. 27, an arc R which passes through the constitutional points K1~K3 is generated, and a line tangential to the arc R at the point K1 is established as the vector Vw1 in the direction of the curve RR (B2). Using the vectors Vw1, Vw3 thus determined, all curves RR (B2) on the region B2 are established in the same manner as with the steps S606, S607, thus defining the region B2. The region B3 can be determined in the same manner as with the region B2.

When the joint surface C composed of the regions B1~B3 is determined, data thereof is outputted to the large-capacity memory 14 in a step S114 shown in FIG. 3. Thereafter, the fillet surfaces F2, F4 which intersect the joint surface C are severed using the data of the joint surface C, generating fillet surfaces F2*, F4* (see FIG. 9) in a step S115. At this time, a phase relationship composed of loop configurations is established with respect to the fillet surfaces F1*~F4* and the joint surface C, as with the phase relationship shown in FIG. 38. Data of the fillet surfaces F1*~F4* and the joint surface C (see FIG. 10) is outputted as fillet surface data to the large-capacity memory 14 in a step S116.

In the above embodiment, the generation of the joint surface C for smoothly connecting the overlapping fillet surfaces F1~F4 has been described above. However, the present invention is also applicable to the generation of a joint surface for connecting fillet surfaces which have already been established that are severed due to a design modification or the like.

Figure 11:
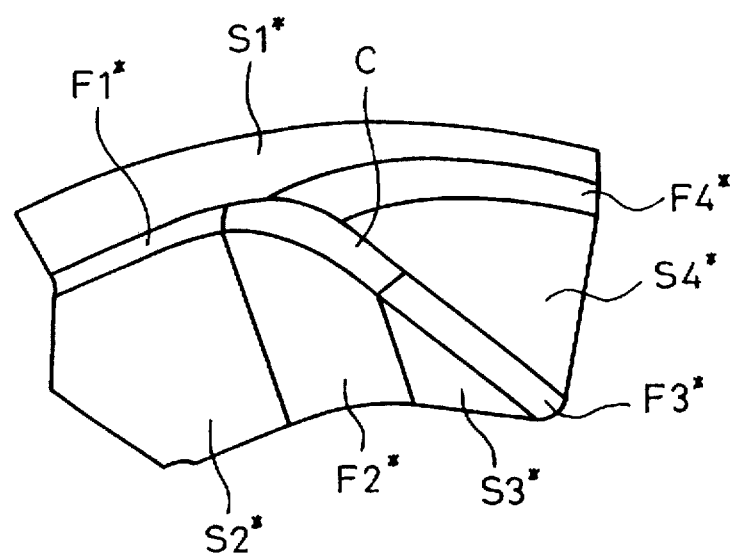
FIG. 11 is a diagram showing a model composed of a combination of the surface model and the fillet model.

Finally, the surface model data shown in FIG. 4 and the fillet model data are combined into full fillet model data representing the fillet surfaces F1*~F4*, the joint surface C, and curved surfaces S1*~S4* shown in FIG. 11 in a step S117.

Since no phase relationship is established between the fillet surfaces F1*~F4*, the joint surface C, and the curved surfaces S1*~S4*, if they were simply combined with each other, then the resultant data would contain data relative to the excessive curved surfaces S1~S4, as described above with reference to FIG. 38. A process of removing excessive data to generate shape data composed of only necessary data will be described below with reference to FIGS. 28, 29, 30, and 31.

Figure 28:
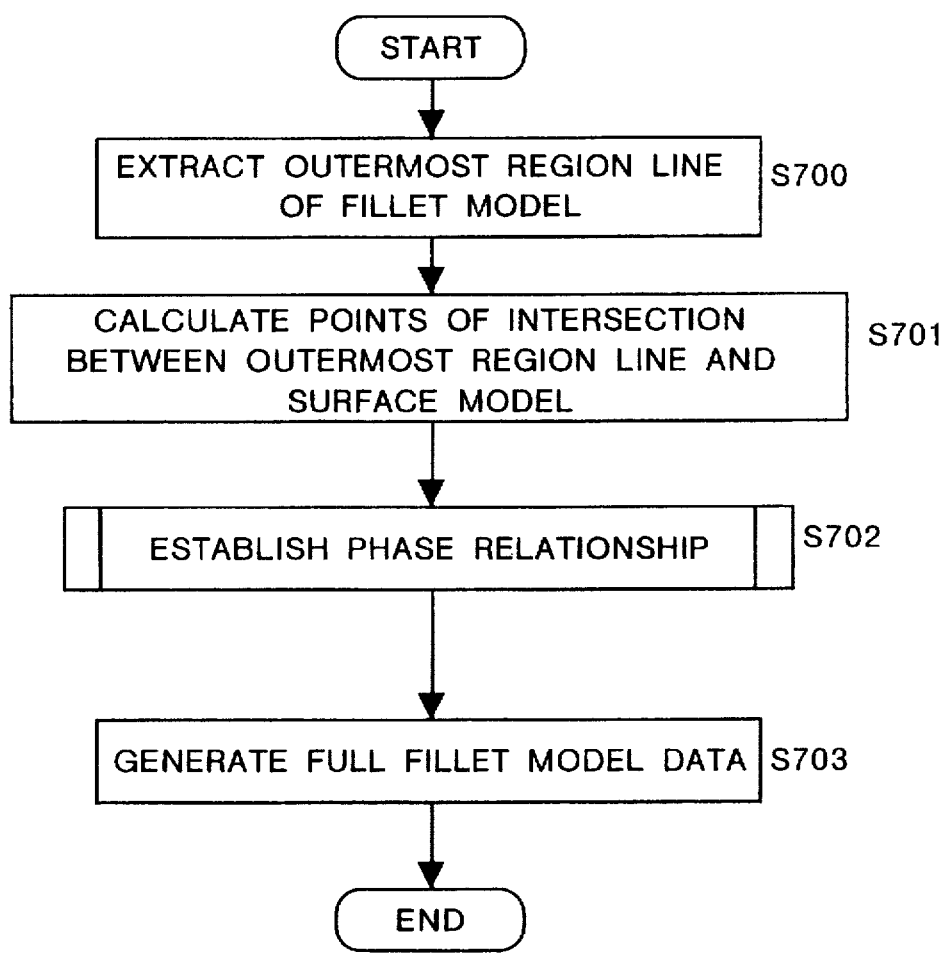
FIG. 28 is a flowchart of a process of combining surface model data and fillet surface data.

An outermost region line Fr of a fillet model (see FIG. 10) composed of the fillet surfaces F1*~F4* and the joint surface C is extracted in a step S700 shown in FIG. 28, and then points e1~e8 (see FIG. 9) of intersection between the outermost region line Fr and all region lines of the surface model (see FIG. 4) composed of the curved surfaces S1~S4 are calculated in a step S701. Using the points e1~e8 of intersection as s reference, a phase relationship with respect to the curved surfaces S1*~S4* is established in a step S702. The step S702 is a subroutine which will be described below with reference to FIG. 29.

Figure 29:
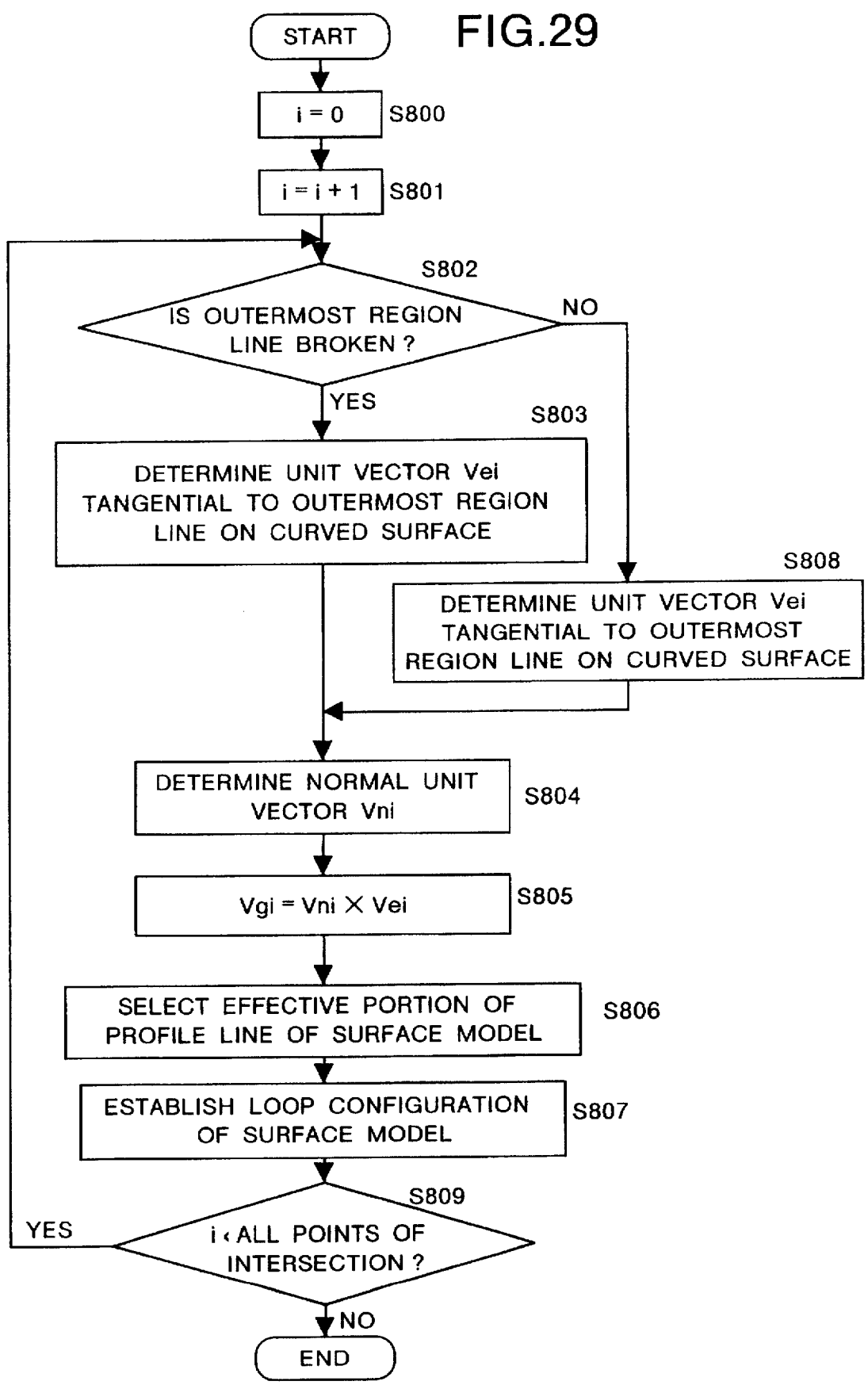
FIG. 29 is a flowchart of a process of determining an effective region in a surface and establishing a phase relationship.
Figure 30:
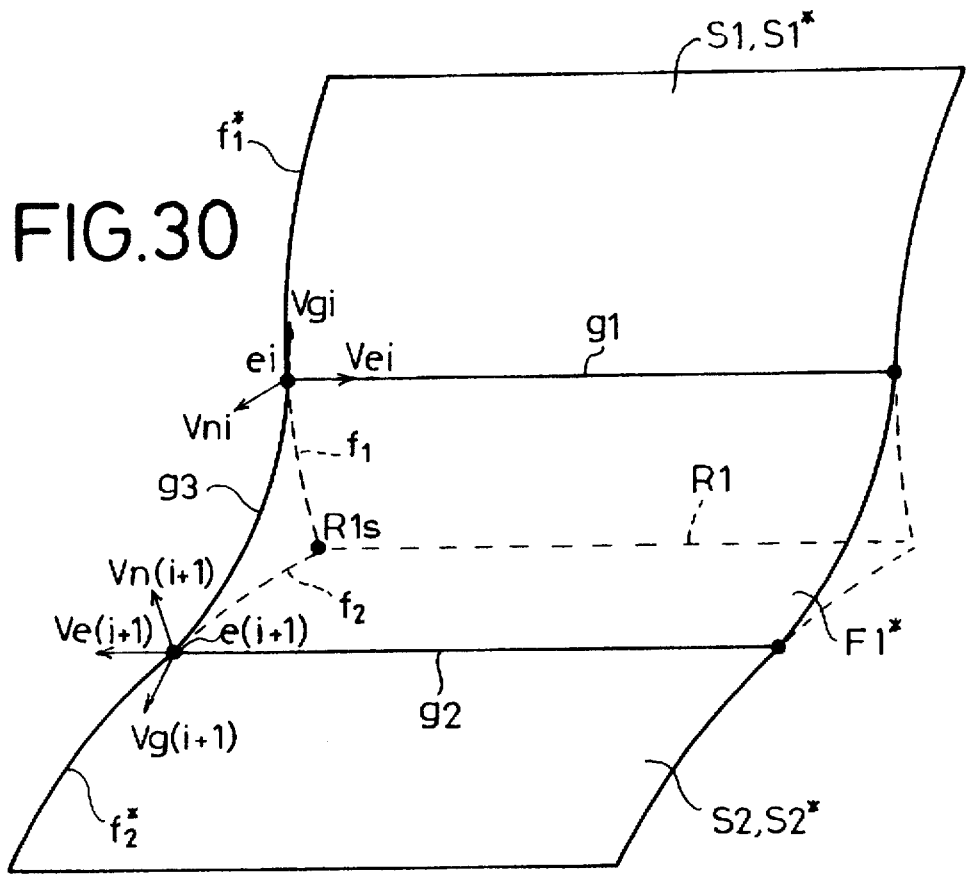
FIG. 30 is a diagram illustrating a process of determining an effective region in a surface.

As shown in FIG. 29, it is determined in a step S800 whether the outermost region line Fr (profile lines g1, g2, g3) of the fillet model is broken at a point ei of intersection which is of interest, i.e., whether the differential coefficients of two outermost region lines (profile lines g1, g3) which are joined at the point ei of intersection are discontinuous or not in steps S800, S801, S802. If the differential coefficients are discontinuous, then a unit vector Vei (see FIG. 30) tangential to the outermost region line (profile line g1) on the curved surface S1 is determined in a step S803. The direction of the tangential unit vector Vei has been determined in advance by a loop configuration which represents a phase relationship for the fillet surface F1* of interest. Then, a unit vector Vn1 normal to the curved surface S1 or the fillet surface F1* at the point ei of intersection is determined in a step S804. The output product of the normal unit vector Vni and the tangential unit vector Vei is determined as a decision vector Vgi in a step S805.

The decision vector Vgi is used to determine the curved surface S1* which is an effective portion of the curved surface S1 that is divided by the profile line g1 of the fillet surface F1*. Specifically, in FIG. 30, of the profile line of the curved surface S1 which is divided by the point ei of intersection, a portion on the side of the curved surface S1* is referred to as a profile line f1*, and the remainder as a profile line f1. The inner product of a vector tangential to the profile lines f1*, f1 at the point ei of intersection and the decision vector Vgi is determined. The profile line f1* where the inner product is of a positive value is selected as an effective portion in a step S806. As a result, the curved surface S1* which contains the profile lines f1*, g1 is selected, and a loop configuration which represents a phase relationship as shown in FIG. 39 is established with respect to the selected side in a step S807. The loop configuration can automatically be established because the profile lines have been determined.

The same processing as described above is carried out with respect to a point e(i+1) of intersection. In this case, since the direction of a unit vector Ve(i+1) tangential to the profile line g2 of the fillet surface F1* is opposite to the direction of the tangential unit vector Vei because of the loop configuration with respect to the fillet surface F1*, a profile line f2* of the curved surface S2* is selected as an effective portion. As a consequence, the curved surface S2* which contains the profile line f2* is selected.

Figure 31:
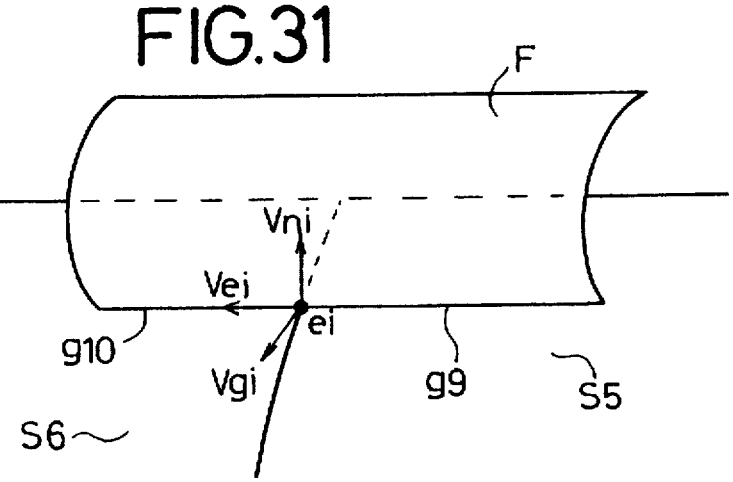
FIG. 31 is a diagram illustrating a process of determining an effective region in a surface.
Figure 32:
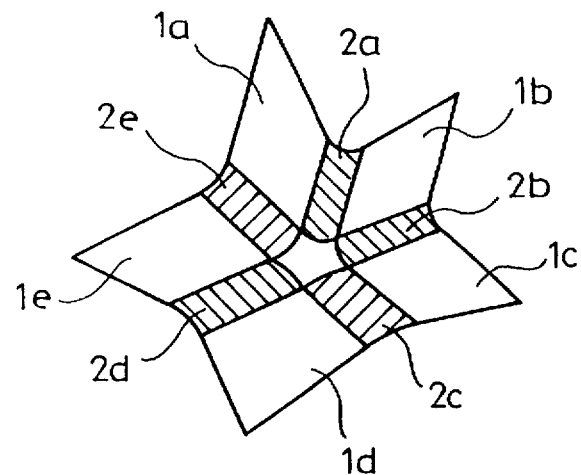
FIG. 32 is a diagram showing a corner surface area which interconnects fillet surfaces established between a plurality of curved surfaces on a conventional system.
Figure 33:
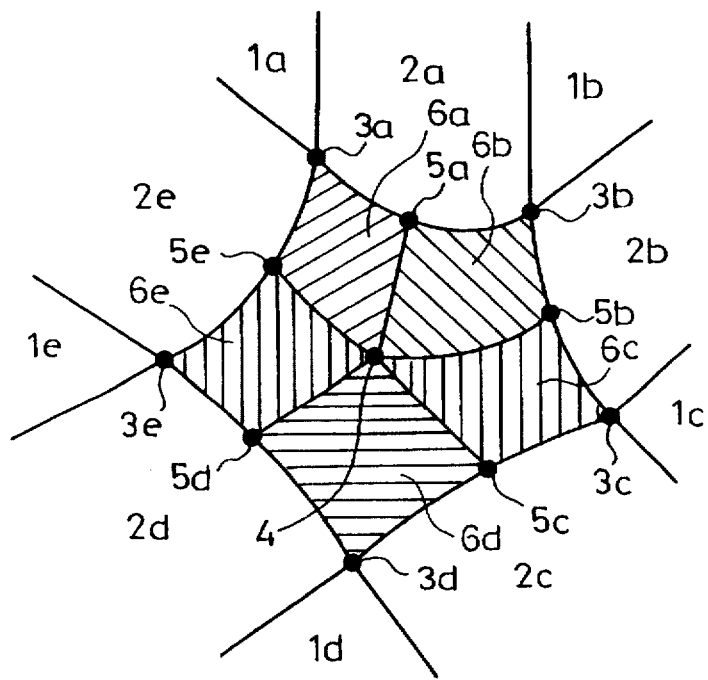
FIG. 33 is a diagram showing the corner surface area, shown in FIG. 32, which is divided into corner surfaces.
Figure 34:
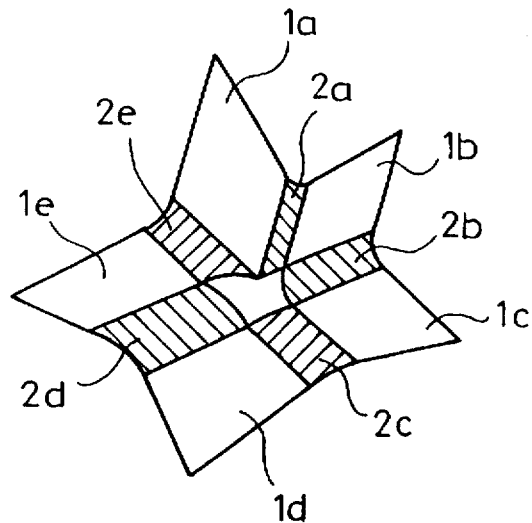
FIG. 34 is a diagram showing a reentrant corner surface area which interconnects fillet surfaces established between a plurality of curved surfaces on the conventional system.
Figure 35:
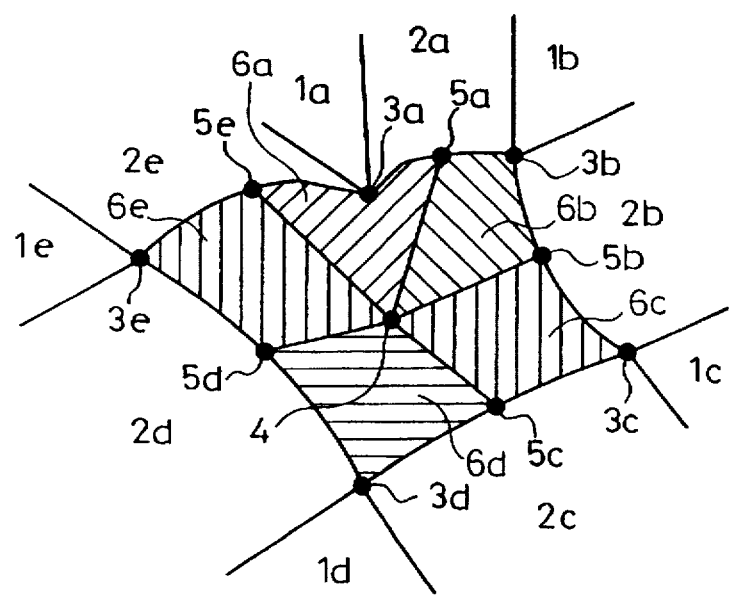
FIG. 35 is a diagram showing the corner surface area, shown in FIG. 34, which is divided into corner surfaces.
Figure 36:
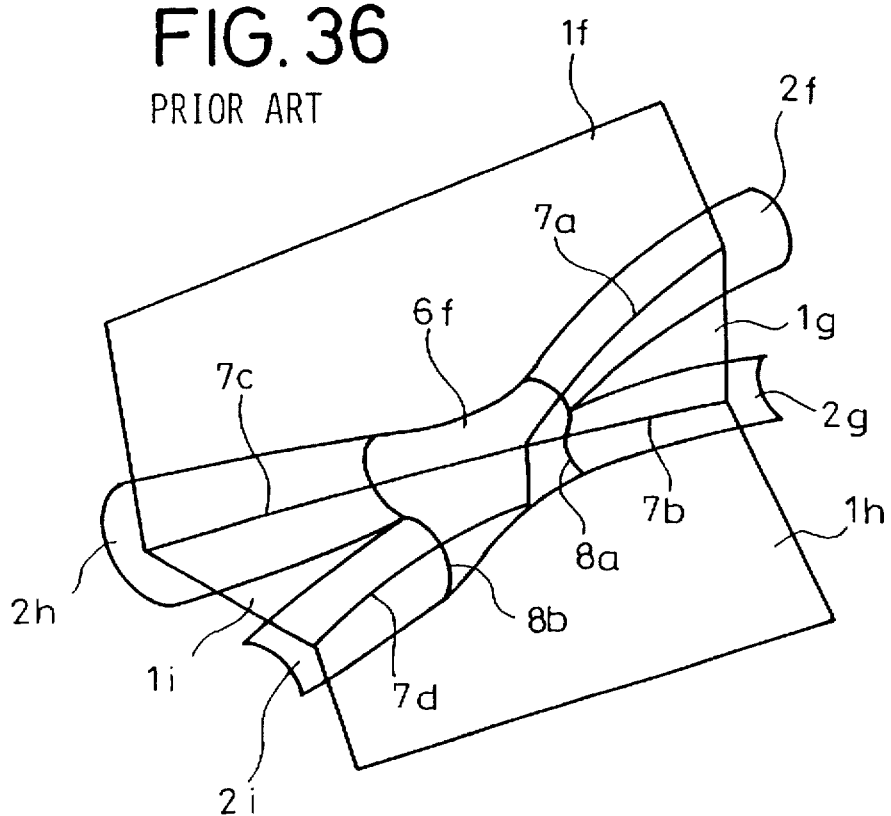
FIG. 36 is a diagram showing profile lines of a corner surface which are of an inverted S shape and an S shape, respectively.
Figure 37:
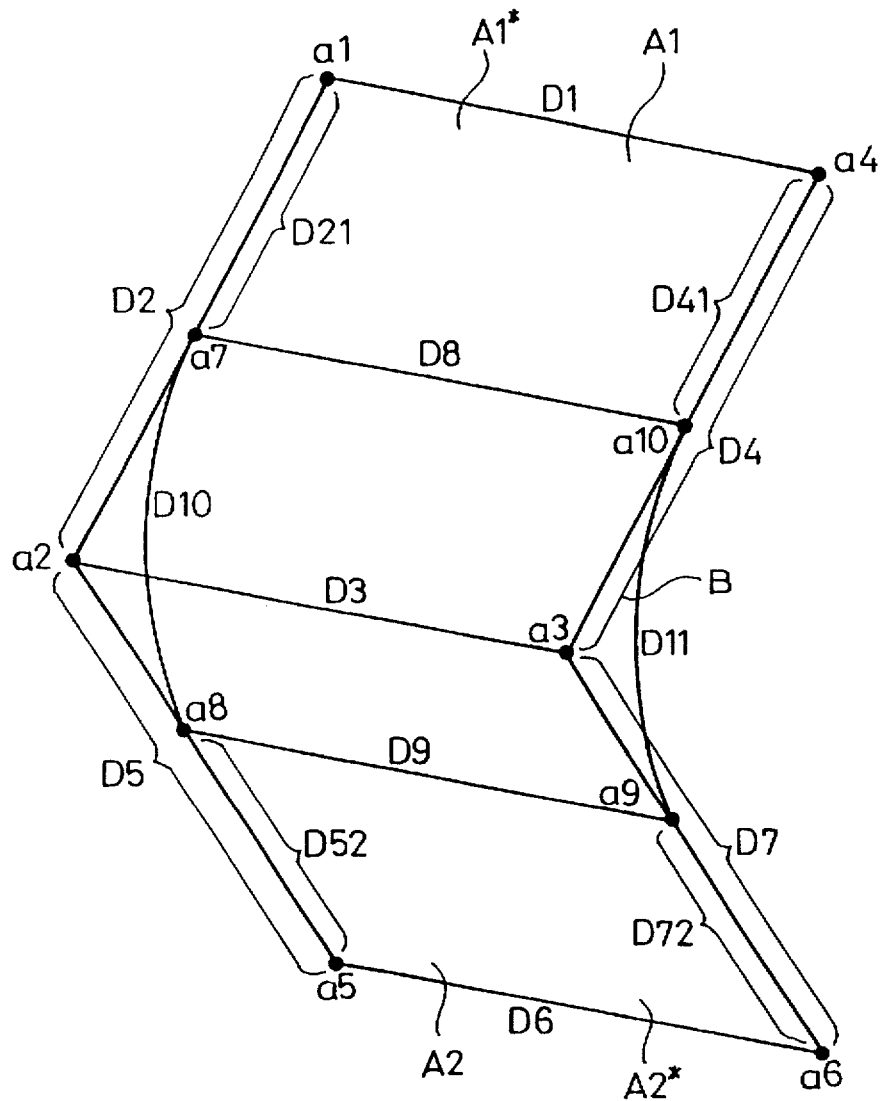
FIG. 37 is a diagram illustrative of a process of establishing a fillet surface between curved surfaces.

If the outermost region line Fr (profile lines g9, g10) of the fillet model is not broken at the point ei of intersection as shown in FIG. 31, i.e., if the outermost region line Fr of the fillet model is established over a plurality of curved surfaces S5, S6, then since either one of the profile lines g9, g10 is present on the curved surfaces S5, S6, a common vector Vgi tangential to the profile lines g9, g10 is determined in a step S808, making it possible to determine an effective portion.

The above processing is effected with respect to all the points e1–e8 of intersection in a step S809, thus generating shape data as full fillet model data representing the fillet surfaces F1*–F4*, the joint surface C, and the curved surfaces S1*–S4* which have a phase relationship in a step S703.

The shape data thus generated is converted into NC machining data, and the NC machining data is transferred to an NC machine tool, which machines a die for manufacturing products. The NC machining data contains data for producing fillet surfaces which smoothly connect curved surfaces of a surface model. Therefore, the die of desired shape can automatically be produced with high accuracy.

In the above embodiment, the point P2 of intersection between the fillet surfaces F1, F2 and the point P3 of intersection between the fillet surfaces F2, F3 are determined, and the joint surface C is established between the fillet surfaces F1, F3 using these points P2, P3 of intersection. However, the points P2, P3 of intersection may be established in any arbitrary locations, and a joint surface may be established between the two fillet surfaces F1, F3.

According to the present invention, as described above, since fillet surfaces can smoothly be connected by a joint surface, a product manufactured on the basis of shape data which is obtained is not required to be finished by the worker. Therefore, the product can be manufactured more easily and products thus manufactured are free of variations. Inasmuch as the phase relationship between surfaces, fillet surfaces, and a joint surface can accurately be established without the need for operator's intervention, complete shape data free of any unnecessary data can be produced with ease. Consequently, a highly accurate product can be manufactured using such complete shape data.

Furthermore, for generating a joint surface for smoothly connecting a plurality of curved surfaces, the joint surface is divided into three regions, then a curved surface for the central region is generated using information of surrounding curved surfaces, and curved surfaces for the other two regions are generated using information of the curved surface for the central region and also the information of surrounding curved surfaces. Therefore, the curved surfaces for the other two regions can smoothly be connected to the curved surface for the central region. As a result, it is possible to produce a joint surface which is smoothly connected to the surrounding curved surfaces.

Moreover, for establishing another curved surface between three or more curved surfaces, profile lines which make up the other curved surface can easily be generated without establishing a phase relationship between the curved surfaces. This makes efficient a process of connecting a plurality of curved surfaces.

According to the present invention, furthermore, an effective region of a surface divided by a fillet surface can automatically be selected on the basis of an outermost region line of the fillet surface. Because a selected new surface is free of unnecessary regions, it is possible to easily establish a phase relationship with respect to the surface. Consequently, shape data having a phase relationship can easily be generated.

Moreover, it is possible to easily generate a joint surface which smoothly connects intersecting fillet surfaces that are established with respect to a surface model. Thus, final shape data representing smoothly connected curved surface can automatically be produced with high accuracy.

Although a certain preferred embodiment of the present invention has been shown and described in detail, it should be understood that various changes and modifications may be made therein without departing from the scope of the appended claims.

What is claimed is:

1. A method of generating shape data, comprising the steps of:

forming fillet surfaces between surfaces of a surface model;

forming a joint surface for smoothly connecting said fillet surfaces;

establishing a phase relationship between said surfaces, said fillet surfaces, and said joint surface, and deleting unnecessary portions from said surfaces based on said phase relationship; and establishing shape data from said surfaces from which the unnecessary portions have been deleted, said fillet surfaces, and said joint surface.

2. A method according to claim 1, wherein said phase relationship is established by determining an outermost region line of said fillet surfaces, determining a tangential vector which is tangential to said outermost region lines at a point of intersection between said outermost region line and all region lines of said surfaces and a normal vector which is normal to said fillet surfaces or said surfaces at said point of intersection, and determining the phase relationship with respect to said surfaces based on the direction of an outer-product vector which is the outer product of said tangential vector and said normal vector.

3. A method according to claim 2, wherein said phase relationship is determined by selecting a portion of said surfaces in the direction of said outer-product vector, and establishing a loop with respect to the selected portion.

4. A method of generating shape data representing fillet surfaces formed between surfaces of a surface model, comprising the steps of:

determining a point of intersection between an outermost region line of the surfaces and an outermost region line of the fillet surfaces;

determining a normal vector which is normal to said surfaces or said fillet surfaces at said point of intersection;

determining a tangential vector which is tangential to said outermost region line of said fillet surfaces which passes through said point of intersection and is present on said surfaces;

determining an outer-product vector which is the outer product of said normal vector and said tangential vector;

selecting a region, positioned in the direction of said outer-product vector, of said surfaces which is divided by said outermost region line of said fillet surfaces which passes through said point of intersection and is present on said surfaces, as new surfaces; and generating shape data from said new surfaces and said fillet surfaces.

5. A method of generating shape data representing a joint surface for smoothly connecting a first curved surface and a second curved surface, comprising:

establishing an end side of the first curved surface, an end side of the second curved surface, and sides which interconnect the end sides, as profile lines of the joint surface;

dividing a region surrounded by said profile lines into a first central region, a second region between said first curved surface and said first central region, and a third region between said second curved surface and said first central region;

generating a first joint surface with respect to said first central region, and thereafter generating a second joint surface with respect to said second region and a third joint surface with respect to said third region; and connecting said first joint surface, said second joint surface, and said third joint surface into said joint surface.

6. A method according to claim 5, wherein said first joint surface is generated according to connecting conditions for smoothly connecting itself to surrounding curved surfaces.

7. A method according to claim 6, wherein said connecting conditions are established as tangential vectors which are tangential to curves at constitutional points on profile lines of other curved surfaces than said second joint surface and said third joint surface which are connected by said first joint surface, from tangential vectors which are tangential to the profile lines and normal vectors which are normal to the curved surfaces.

8. A method according to claim 5, further comprising the steps of establishing a plurality of constitutional points on profile lines of curved surfaces to which said first joint surface is to be connected, determining a plurality of curves connecting said constitutional points, and generating said first joint surface based on said curves.

9. A method according to claim 5, wherein said second joint surface and said third joint surface are generated based on constitutional points on a curve on said first joint surface, and a constitutional point on profile lines of a first curved surface and a second curved surface to which said second joint surface and said third joint surface are to be connected.

10. A method of generating shape data to generate a profile line of a joint surface for connecting a first curved surface and a second curved surface, comprising the steps of:

establishing tangential vectors tangential respectively to the first curved surface and the second curved surface at an end point of the first curved surface and an end point of the second curved surface;

establishing a temporary curve between said end points using said tangential vectors;

projecting said temporary curve onto at least three third curved surfaces between said first curved surface and said second curved surface, thereby generating projected curves;

establishing the projected curve connected to said first curved surface as a starting curve, and the projected curve connected to said second curved surface as an ending curve, and successively selecting the projected curve smoothly connected to said starting curve and said ending curve to determine a connected relationship of said projected curves; and connecting said projected curves based on said connected relationship thereby to generate the profile line.

11. A method according to claim 10, said projected curves are generated by projecting said temporary curve in a direction determined by a vector which is a combination of normal vectors which are normal to said first curved surface and said second curved surface, respectively, at respective end points thereof.

12. A method of generating shape data by forming fillet surfaces between surfaces of a surface model, comprising the steps of:

selecting two fillet surfaces to be connected, and establishing end points on said fillet surfaces;

establishing curves connecting said end points on curved surfaces of the surface model and said selected fillet surfaces;

generating a joint surface surrounded by said curves; and connecting said curves with said joint surface.

13. A method according to claim 12, wherein said end points comprise points of intersection between said selected fillet surfaces and another fillet surface, and end points corresponding to said points of intersection and positioned on the respective fillet surfaces.

14. A method according to claim 12, further comprising the steps of determining tangential vectors which are tangential to profile lines of said fillet surfaces at said end points, determining a temporary curve based on said tangential vectors, projecting said temporary curve onto curved surfaces between said fillet surfaces thereby to generate projected curves, and determining said curves connecting said end points on said selected fillet surfaces as said projected curves.

15. A method according to claim 12, wherein said joint surface is generated by establishing constitutional points on the curves which constitute profile lines, and establishing the curves which connect corresponding ones of the constitutional points.

* * * * *